(12) United States Patent
Okura et al.

(10) Patent No.: US 11,849,235 B2
(45) Date of Patent: Dec. 19, 2023

(54) SOLID-STATE IMAGING DEVICE, METHOD FOR DRIVING SOLID-STATE IMAGING DEVICE, AND ELECTRONIC APPARATUS

(71) Applicants: Brillnics Singapore Pte. Ltd., Singapore (SG); THE RITSUMEIKAN TRUST, Kyoto (JP)

(72) Inventors: Shunsuke Okura, Shiga (JP); Ai Otani, Shiga (JP); Ken Miyauchi, Tokyo (JP); Hideki Owada, Tokyo (JP); Sangman Han, Tokyo (JP); Isao Takayanagi, Tokyo (JP)

(73) Assignees: Brillnics Singapore Pte. Ltd., Singapore (SG); THE RITSUMEIKAN TRUST, Kyoto (JP)

(*) Notice: Subject to any disclaimer, the term of this patent is extended or adjusted under 35 U.S.C. 154(b) by 0 days.

(21) Appl. No.: 17/842,279

(22) Filed: Jun. 16, 2022

(65) Prior Publication Data

US 2022/0408047 A1 Dec. 22, 2022

(51) Int. Cl.
*H04N 25/75* (2023.01)
*H04N 25/59* (2023.01)
*H04N 25/65* (2023.01)
*H04N 25/772* (2023.01)
*H04N 25/778* (2023.01)

(52) U.S. Cl.
CPC ............ *H04N 25/75* (2023.01); *H04N 25/59* (2023.01); *H04N 25/65* (2023.01); *H04N 25/772* (2023.01); *H04N 25/778* (2023.01)

(58) Field of Classification Search
CPC ........ H04N 25/75; H04N 25/59; H04N 25/65; H04N 25/772; H04N 25/778; H04N 25/78
See application file for complete search history.

(56) References Cited

U.S. PATENT DOCUMENTS 11,418,734 B1* 8/2022 Wang ................. H04N 25/709
2008/0266434 A1 10/2008 Sugawa et al.
(Continued)

FOREIGN PATENT DOCUMENTS

JP 2005-328493 A 11/2005
JP 2020-115603 A 7/2020

*Primary Examiner* — Nhan T Tran
(74) *Attorney, Agent, or Firm* — PILLSBURY WINTHROP SHAW PITTMAN LLP

(57) ABSTRACT

Provided are a solid-state imaging device, a method for driving a solid-state imaging device, and an electronic apparatus capable of reading signals produced with different conversion gains and having different signal directions. A pixel signal processing part 400 includes a first reading part 410 and a second reading part 420. Of a pixel signal PIXOUT input into an input node ND401, the first reading part 410 inverts the signal direction of a first-conversion-gain signal (HCGRST, HCGSIG) and outputs an inverted first-conversion-gain signal (HCGRST, HCGSIG), which has been subjected to inversion and amplification, to an AD converting part 430 via a connection node ND402. Of the pixel signal PIXOUT input into the input node ND401, the second reading part 420 keeps the signal direction of a second-conversion-gain signal (LCGSIG, LCGRST) unchanged, and outputs a non-inverted second-conversion-gain signal (LCGSIG, LCGRST) to the AD converting part 430 via the connection node ND402.

18 Claims, 20 Drawing Sheets

(56) References Cited

U.S. PATENT DOCUMENTS

2018/0054576 A1* 2/2018 Otaka .................... H04N 25/59
2020/0236318 A1 7/2020 Shunsuke
2020/0389614 A1* 12/2020 Benjaram ......... H01L 27/14603
2021/0067720 A1* 3/2021 Benjaram ......... H01L 27/14612

* cited by examiner

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2021-102293 (filed on Jun. 21, 2021), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensors include, for each pixel, a photodiode (a photoelectric conversion element) and a floating diffusion (FD) amplifier having a floating diffusion (FD). The mainstream design of the reading operation in the CMOS image sensors is a column parallel output processing performed by selecting a row in a pixel array and reading the pixels simultaneously in the column direction.

The solid-state imaging devices (CMOS image sensors) can be constituted by, for example, basic 4-transistor (4Tr) pixels. The 4Tr pixels each include, for one photodiode (photoelectric conversion element), one transfer transistor serving as a transfer element, one reset transistor serving as a reset element, one source follower transistor serving as a source follower element and one selection transistor serving as a selection element.

The transfer transistor remains selected and in the conduction state during a predetermined transfer period to transfer to the floating diffusion FD the charges (electrons) produced by the photoelectric conversion and then stored in the photodiode. The reset transistor remains selected and in the conduction state during a predetermined reset period to reset the floating diffusion FD to the potential of a power supply line. The selection transistor remains selected and in the conduction state during a reading scan operation, so that the source follower transistor outputs, to the vertical signal line, a read-out signal of a column output generated as a voltage signal by conversion performed by the floating diffusion FD.

For example, in a read-out scan period, the floating diffusion FD is reset to the potential of the power supply line (the reference potential) in a reset period, the charges in the floating diffusion FD are then converted into a voltage signal with a gain corresponding to the FD capacitance, and the voltage signal is output to the vertical signal line as a read-out reset signal Vrst of the reference level (a signal of the reference level). Subsequently, in a predetermined transfer period, the charges (electrons) produced by the photoelectric conversion in the photodiode and then stored therein are transferred to the floating diffusion FD. The charges in the floating diffusion FD are then converted into a voltage signal with a gain corresponding to the FD capacitance, and the voltage signal is output to the vertical signal line as a read-out signal Vsig of the signal level (a signal of the signal level). The output signals from the pixel are subjected to the CDS (correlated double sampling) process in the form of a differential signal (Vsig-Vrst) in a column reading circuit.

As described above, an ordinary pixel read-out signal (hereinafter also referred to as "pixel signal") PS includes one read-out reset signal Vrst of the reference level and one read-out signal Vsig of the signal level.

To improve characteristics, various methods have been proposed for fabricating solid-state imaging devices (CMOS image sensors) that have a high dynamic range (HDR) and provides a high picture quality.

One of the methods to increase the dynamic range, lateral overflow integration capacitor (LOFIC) can be proposed (see, for example, Patent Literature 1). When having the LOFIC configuration, the pixels have a storage capacitor and a storage transistor in addition to the above-listed basic constituents, so that overflow charges overflowing from the photodiode within the same exposure period are not wasted but stored in the storage capacitor.

The LOFIC pixel can have two types of conversion gains: the conversion gain determined by the capacitance Cfd1 of the floating diffusion (high gain: proportional to 1/Cfd1); and the conversion gain determined by the sum of the capacitance Cfd1 of the floating diffusion and the LOFIC capacitance Clofic of the storage capacitor C2 (low gain: proportional to 1/(Cfd1+Clofic)). In other words, the LOFIC pixels can achieve high well capacity and low dark noise using the low-conversion-gain (LCG) signals and high-conversion-gain (HCG) signals.

LIST OF RELEVANT PATENT LITERATURE

Patent Literature 1: Japanese Patent Application Publication No. 2005-328493
Patent Literature 2: Japanese Patent Application Publication No. 2020-115603

SUMMARY

The LOFIC architecture, however, has serious issues, or faces a reduced SNR at the conjunction (combination) point of a high conversion gain (HCG) signal and a low conversion gain (LCG) signal. More specifically, the LOFIC architecture alone can not remove kTC noise of the LCG signal, which results in a lower SNR at the conjunction point between the HCG signal and the LCG signal.

For example, although not intended for the LOFIC architecture, Patent Literature 2 proposes a specific circuit configuration of a pixel signal processing part in a reading circuit of a solid-state imaging device that is capable of removing noise gap at the conjunction point between low-conversion-gain data and high-conversion-gain data, preventing an increase in power consumption and circuit area and additionally achieving a high dynamic range.

The CMOS image sensor having the LOFIC architecture requires a dual reading circuit since the high-conversion-gain (HCG) signal and the low-conversion-gain (LGC) signal have opposite signal directions, more specifically, opposite level-transitioning directions. The pixel signal processing part in the reading circuit disclosed in Patent Literature 2, however, is configured to read both the HCG signal and the LCG signal generated by the single-exposure HDR (SEHDR) pixels having the same signal direction and thus can be hardly applied to the CMOS image sensor having the LOFIC architecture without a change.

In order to provide for a dual reading circuit applicable to the CMOS image sensor having the LOFIC architecture, a reading circuit is required that can process both the LCG and HCG signals with a minimum circuit overhead for the purposes of reduced chip cost and that can achieve reduced power consumption.

An object of the present invention is to provide a solid-state imaging device, a method for driving a solid-state imaging device, and an electronic apparatus that are capable of reading signals produced with different conversion gains and having different signal directions. An object of the present invention is to provide a solid-state imaging device, a method for driving a solid-state imaging device, and an electronic apparatus that are capable of not only reading signals produced with different conversion gains and having different signal directions but also preventing an increase in power consumption and circuit area, providing a high dynamic range, and thus achieving high image quality.

A first aspect of the present invention provides a solid-state imaging device including: a readable pixel for performing photoelectric conversion, where the readable pixel is configured to produce, as a readable pixel signal, a first-conversion-gain signal and a second-conversion-gain signal corresponding to at least two conversion gains and having opposite signal directions; and a pixel signal processing part for processing the pixel signal read out from the readable pixel. The pixel signal processing part includes: an input node for receiving the pixel signal read out from the readable pixel input thereto; a connection node connected to a next-stage circuit; a first reading part for inverting a signal direction of the first-conversion-gain signal of the pixel signal input into the input node and outputting an inverted first-conversion-gain signal to the connection node; and a second reading part for keeping a signal direction of the second-conversion-gain signal of the pixel signal input into the input node unchanged and outputting a non-inverted second-conversion-gain signal to the connection node.

A second aspect of the present invention provides a method for driving a solid-state imaging device including a readable pixel for performing photoelectric conversion, where the readable pixel is configured to produce, as a readable pixel signal, a first-conversion-gain signal and a second-conversion-gain signal corresponding to at least two conversion gains and having opposite signal directions; and a pixel signal processing part for processing the pixel signal read out from the readable pixel. The pixel signal processing part includes: an input node for receiving the pixel signal read out from the readable pixel input thereto; a connection node connected to a next-stage circuit; a first reading part for inverting a signal direction of the first-conversion-gain signal of the pixel signal input into the input node and outputting an inverted first-conversion-gain signal to the connection node; and a second reading part for keeping a signal direction of the second-conversion-gain signal of the pixel signal input into the input node unchanged and outputting a non-inverted second-conversion-gain signal to the connection node. The first reading part performs, in a first-conversion-gain signal read-out mode, inversion read-out for a first read-out reset signal produced with a first conversion gain, and subsequently inversion read-out for a first read-out luminance signal produced with the first conversion gain, and the second reading part performs, in a second-conversion-gain signal read-out mode, non-inversion read-out for a second read-out luminance signal produced with a second conversion gain, and subsequently non-inversion read-out for a second read-out reset signal produced with the second conversion gain.

A third aspect of the invention provides an electronic apparatus including: a solid-state imaging device; and an optical system for forming a subject image on the solid-state imaging device. The solid-state imaging device includes: a readable pixel for performing photoelectric conversion, where the readable pixel is configured to produce, as a readable pixel signal, a first-conversion-gain signal and a second-conversion-gain signal corresponding to at least two conversion gains and having opposite signal directions; and a pixel signal processing part for processing the pixel signal read out from the readable pixel. The pixel signal processing part includes: an input node for receiving the pixel signal read out from the readable pixel input thereto; a connection node connected to a next-stage circuit; a first reading part for inverting a signal direction of the first-conversion-gain signal of the pixel signal input into the input node and outputting an inverted first-conversion-gain signal to the connection node; and a second reading part for keeping a signal direction of the second-conversion-gain signal of the pixel signal input into the input node unchanged and outputting a non-inverted second-conversion-gain signal to the connection node.

Advantageous Effects

According to the present invention, signals produced with different conversion gains and having different signal directions can be read. According to the present invention, signals produced with different conversion gains and having different signal directions can be read, but also an increase in power consumption and circuit area can be prevented, a high dynamic range can be provided, and high image quality is thus achieved.

DESCRIPTION OF THE PREFERRED EMBODIMENTS

Embodiments of the present invention will be hereinafter described with reference to the drawings.

First Embodiment

Figure 1:
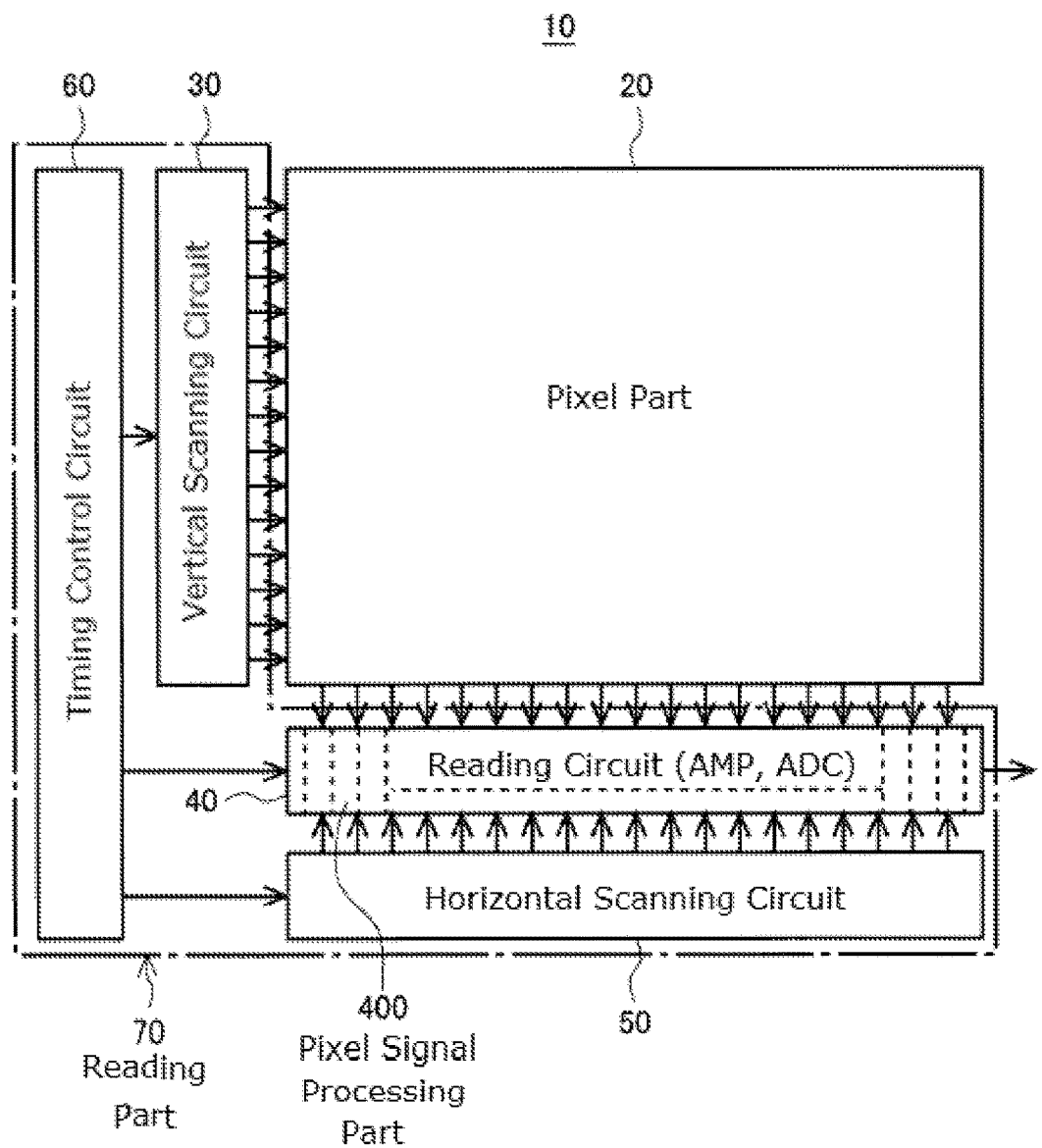
FIG. 1 is a block diagram showing an example configuration of a solid-state imaging device according to a first embodiment of the present invention.
Figure 2:
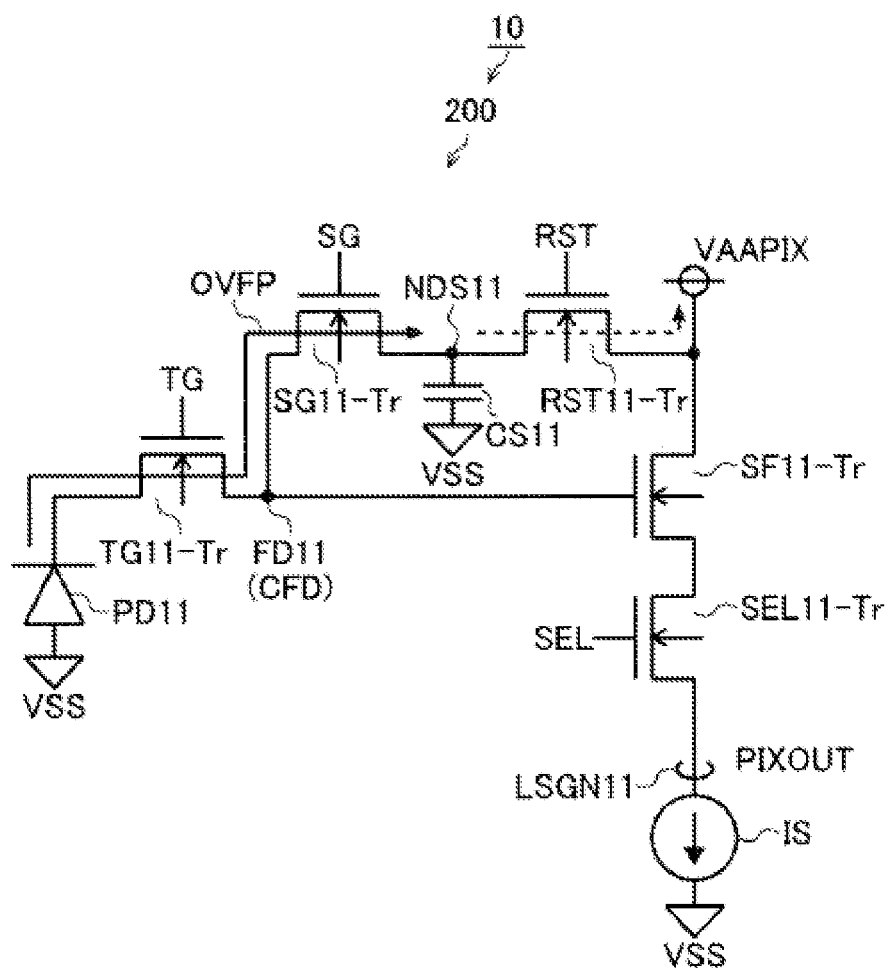
FIG. 2 is a circuit diagram showing an example of a readable pixel according to the first embodiment.
Figure 3:
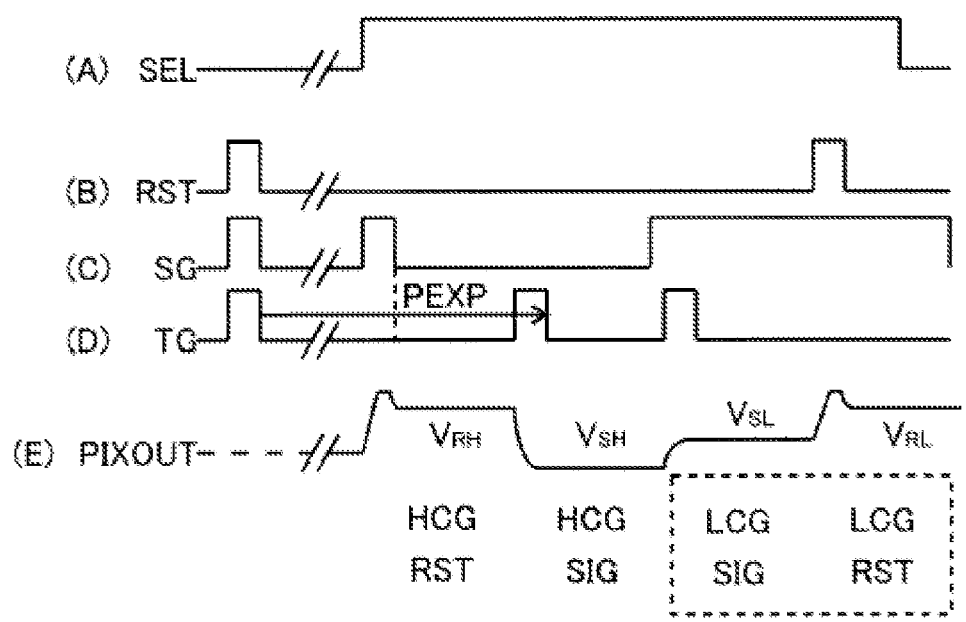
FIG. 3 is a timing chart to illustrate an example sequence of operations for reading performed on a readable pixel in the solid-state imaging device relating to the first embodiment of the present invention.

FIG. 1 is a block diagram showing an example configuration of a solid-state imaging device relating to a first embodiment of the present invention. FIG. 2 is a circuit diagram showing an example configuration of a readable pixel of the solid-state imaging device relating to the first embodiment of the present invention. FIG. 3 is a timing chart including parts (A) to (E) to illustrate an example sequence of operations for reading performed on the readable pixel in the solid-state imaging device relating to the first embodiment of the present invention.

In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40 including a pixel signal processing part 400, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading pixel signals.

In the first embodiment, readable pixels 200 are arranged in a matrix pattern in the pixel part 20, and each readable pixel 200 is basically configured as shown in FIG. 2. More specifically, the readable pixel 200 includes: a floating diffusion FD 11 storing therein the to-be-transferred charges so that the charges can be read in the form of a voltage signal; a photodiode PD11 serving as a photoelectric conversion element for storing, in an exposure period PEXP, therein the charges determined by the amount of incident light; a transfer transistor TG11-Tr serving as a transfer element for transferring to the floating diffusion FD11 the charges stored in the photodiode PD11 serving as the photoelectric conversion element, where the transfer transistor TG11-Tr remains in a non-conduction state during the exposure period PEXP and remains in a conduction state during a transfer period; and a reset transistor RST11-Tr serving as a reset element for performing a reset operation of discharging the charges stored in the floating diffusion FD11.

The readable pixel 200 further includes: a storage capacitor CS11 serving as a storage capacitance element for storing therein overflow charges overflowing from the photodiode PD11 serving as the photoelectric conversion element; and a storage transistor SG11-Tr serving as the storage connection element to selectively connect the floating diffusion FD11 and the storage capacitor CS11 serving as the storage capacitance element.

In addition, the readable pixel 200 includes an overflow path OVFP for allowing the charges, which overflow from the photodiode PD11 serving as the photoelectric conversion element toward the floating diffusion FD11 through the transfer transistor TG11-Tr, to overflow toward the region where the storage capacitor CS11 serving as a charge capacitance element is formed. The storage capacitor CS11 is connected between a storage node NDS11 formed in a predetermined region in the overflow path OVFP and a reference potential VSS, a storage transistor SG11-Tr is connected between the storage node NDS11 and the floating diffusion FD11, and the reset transistor RST11-Tr is connected between a power supply potential VAAPIX and the storage node NDS11. The readable pixel 200 further includes a source follower transistor SF11-Tr serving as a source follower element for outputting the voltage signal produced by the conversion by the floating diffusion FD11 and a selection transistor SEL11-Tr serving as a selection element.

The readable pixel 200 relating to the present embodiment is configured to, under control of the reading part 70, change the capacitance of the floating diffusion FD11 between a first capacitance and a second capacitance to change the conversion gain between a first conversion gain (for example, high conversion gain: HCG) corresponding to the first capacitance and a second conversion gain (for example, low conversion gain: LCG) corresponding to the second capacitance, by selectively connecting the floating diffusion FD11 to the storage capacitor CS11 serving as the storage capacitance element through the storage transistor SG11-Tr serving as a storage connection element.

As described above, the solid-state imaging device 10 is configured to perform, under control of the reading part 70, first-conversion-gain mode read-out and second-conversion-gain mode read-out in a designated dual-conversion-gain read-out mode period as shown in FIG. 3. In the first-conversion-gain mode read-out, pixel signals are read with the first conversion gain (high conversion gain (HCG)) corresponding to the first capacitance, and in the second-conversion-gain mode read-out, pixel signals are read with the second conversion gain (low conversion gain: LCG) corresponding to the second capacitance (different from the first capacitance).

The readable pixel 200 has, for example, a lateral overflow integration capacitor (LOFIC), so that a dual-sampling read-out mode (LOFIC mode) operation can be performed in a low illuminance circumstance under control of the reading part 70. In the LOFIC mode operation, the second conversion gain is used, which is related to the charges stored in the photodiode PD11 serving as the photoelectric conversion element and the overflow charges.

The readable pixel 200 relating to the first embodiment can be subject to the dual-conversion-gain read-out involving the first-conversion-gain mode read-out according to which the pixel signals are read with the first conversion gain (for example, high conversion gain: HCG) corresponding to the first capacitance and the second-conversion-gain mode read-out according to which the pixel signals are read with the second conversion gain (for example, the low conversion gain: LCG) corresponding to the second capacitance (different from the first capacitance). In the first embodiment, the read-out operation for the readable pixel 200 involves, in a first-conversion-gain signal read-out mode, reading a first read-out reset signal HCGRST and subsequently a first read-out luminance signal HCGSIG, as shown in FIG. 3. In a subsequent second-conversion-gain signal read-out mode, a second read-out luminance signal LCGSIG and a second read-out reset signal LCGRST are sequentially read out.

Accordingly, the first-conversion-gain signal (HCGRST, HCGSIG) and the second-conversion-gain signal (LCGSIG, LCGRST) read out as the pixel signal PXLOUT from the readable pixel 200 have opposite signal directions (opposite level transitioning directions).

(Specific Circuit Configuration of Pixel 200)

The following now specifically describes the circuit configuration of the readable pixel 200 shown in FIG. 2. In the following description, the readable pixel 200 has an LOFIC configuration, for example.

In the pixel part 20, the readable pixels 200 each including a photodiode (photoelectric conversion element) and an in-pixel amplifier are arranged in a two-dimensional matrix comprised of N rows and M columns.

The readable pixel 200 includes, for example as shown in FIG. 2: the photodiode PD11 serving as the photoelectric conversion element; the transfer transistor TG11-Tr serving as the transfer element; the reset transistor RST11-Tr serving as the reset element; the source follower transistor SF11-Tr serving as the source follower element; the selection transistor SEL11-Tr serving as the selection element; the storage transistor SG11-Tr serving as the storage connection element; the storage capacitor CS11 serving as the storage capacitance element; the floating diffusion FD11; and the storage node NDS11 connected to the storage capacitor CS11.

In the readable pixel 200, the capacitance CFD of the floating diffusion FD11 is very small for achieving a low noise. The capacitance CS1 of the storage capacitor CS11 is very large (electrostatic capacitance) for achieving a high full well capacity (FWC). The capacitance CS1 of the storage capacitor CS11 is greater than the capacitance CFD of the floating diffusion FD11. The capacitance CFD of the floating diffusion FD11 is mainly used to accomplish the high conversion gain, and the capacitance CS1 of the storage capacitor CS11 is additionally used to accomplish the low conversion gain.

The photodiode PD11 generates signal charges (electrons) in an amount determined by the amount of the incident light and stores the same. A description will be hereinafter given of a case where the signal charges are electrons and each transistor is an n-type transistor. However, it is also possible that the signal charges are holes or each transistor is a p-type transistor.

In each readable pixel 200, the photodiode (PD) is a pinned photodiode (PPD). On a substrate surface for forming the photodiodes (PDs), there is a surface level due to dangling bonds or other defects, and therefore, a lot of charges (dark current) are generated due to heat energy, so that signals fail to be read out correctly. In the case of a pinned photodiode (PPD), a charge storage part of the photodiode (PD) is buried in the substrate to reduce mixing of the dark current into signals.

The transfer transistor TG11-Tr is connected between the photodiode PD11 and the floating diffusion FD11 and controlled through a control signal TG. The transfer transistor TG11-Tr remains selected and in the conduction state during a period in which the control signal TG is at the high (H) level, to transfer to the floating diffusion FD11 the charges (electrons) produced by photoelectric conversion by the photodiode PD11 and then stored in the storage node.

In the example shown in FIG. 2, the reset transistor RST11-Tr is connected between the power supply potential VAAPIX and the storage node NDS11 and controlled through a control signal RST. The reset transistor RST11-Tr remains selected and in the conduction state during a period in which the control signal RST is at the H level, to reset the floating diffusion FD11 (and the storage capacitor CS11) to the power supply potential VAAPIX when the storage transistor SG11-Tr is in the conduction state.

In the first embodiment, the reset transistor RST11-Tr, the storage transistor SG11-Tr and the transfer transistor TG11-Tr remain in the conduction state, so that the floating diffusion FD11 and the photodiode PD11 are reset. In the first embodiment, the reset transistor RST11-Tr and the storage transistor SG11-Tr remain in the conduction state, so that the floating diffusion FD11 and the storage capacitor CS11 are reset.

The storage transistor SG11-Tr is connected between the floating diffusion FD11 (and the reset transistor RST11-Tr) and the storage capacitor CS11 via the storage node NDS11. The storage transistor SG11-Tr is controlled by a control signal SG applied to the gate thereof through a control line. The storage transistor SG11-Tr remains selected and in the conduction state during a period in which the control signal SG is at the H level, to connect between the floating diffusion FD11 (and the reset transistor RST11-Tr) and the storage capacitor CS11. In the first embodiment, the reset transistor RST11-Tr and the storage transistor SG11-Tr remain in the conduction state, so that the floating diffusion FD11 and the storage capacitor CS11 are reset, as mentioned above.

In the first embodiment, the overflow path OVFP is, as shown in FIG. 2, formed so as to allow the charges overflowing from the photodiode PD11 to be transferred to the storage capacitor CS11 through the floating diffusion FD11, the storage transistor SG11-Tr, the storage node NDS11 (as indicated by the solid arrow), and also formed so as to allow the charges overflowing from the storage capacitor CS11 to be transferred to the power supply potential VAAPIX through the storage node NDS11 and the reset transistor RST11-Tr (as indicted by the dotted arrow).

The source follower transistor SF11-Tr and the selection transistor SEL11-Tr are connected in series between the power supply potential VAAPIX and the vertical signal line LSGN11. The gate of the source follower transistor SF11-Tr is connected to the floating diffusion FD11, and the selection transistor SEL11-Tr is controlled by a control signal SEL applied to the gate thereof through a control line. The selection transistor SEL11-Tr remains selected and in the conduction state during a selection period in which the control signal SEL is at the H level. In this way, the source follower transistor SF11-Tr outputs, to the vertical signal line LSGN11, a read-out voltage signal (VRST1, VSIG1) of a column output, which is a voltage signal produced through the conversion performed by the floating diffusion FD11.

Since the pixel part 20 includes the readable pixels 200 arranged in N rows and M columns, N control lines are provided for each of the control signals, and M vertical signal lines are provided. In FIG. 1, the control lines for each row are represented as a single row-scanning control line.

The vertical scanning circuit 30 drives the pixels in shutter and read-out rows through the row-scanning control lines under the control of the timing control circuit 60. Further, the vertical scanning circuit 30 outputs, according to address signals, row selection signals for row addresses of the reading rows from which signals are read out and the shutter rows in which the charges stored in the photodiodes PD11 are reset.

The reading circuit 40 includes a plurality of pixel signal processing parts 400, which are a plurality of column signal processing circuits (not shown) arranged corresponding to the column outputs of the pixel part 20, and the reading circuit 40 may be configured such that the plurality of column signal processing circuits can perform column parallel processing. In the reading circuit 40, the pixel signal processing parts 400 are capable of inverting one of the first-conversion-gain signal (HCGRST, HCGSIG) and the second-conversion-gain signal (LCGSIG, LCGRST), which have opposite signal directions or opposite level transitioning directions and are read out as the pixel signal PXLOUT from the readable pixels 200, specifically, the first-conversion-gain signal. The pixel signal processing parts 400 are further capable of, after aligning their signal directions (signal transitioning directions), analog-to-digital (AD) converting the first- and second-conversion-gain signals. The specific example circuit configuration of the pixel signal processing parts will be described below in detail.

The horizontal scanning circuit 50 scans the signals processed in the plurality of pixel signal processing parts 400 of the reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

When a dual-conversion-gain read-out mode MDCG is designated, the reading part 70 performs a first-conversion-gain reset read-out operation HCGRRD, a first-conversion-gain read-out operation HCGRRD, a second-conversion-gain read-out operation LCGSRD, and a second-conversion-gain reset read-out operation LCGRRD.

In the first embodiment, the reading part 70 performs, after an exposure period PEXP starts, a read-out operation in the dual-conversion-gain read-out mode MDCG, as a read-out mode operation.

For example, the reading part 70 controls the reset transistor RST11-Tr, the storage transistor SG11-Tr and the transfer transistor TG11-Tr to remain in the conduction state for a predetermined period of time, so that the photodiode PD11, the floating diffusion FD11 and the storage capacitor CS11 are reset to perform a shutter operation, and controls the transfer transistor TG11-Tr to remain in the non-conduction state to start the exposure period PEXP, as shown in FIG. 3. After the exposure period PEXP starts, the reading part 70 performs operations corresponding to the dual-conversion-gain read-out mode DMCG, specifically, sequentially performs a first-conversion-gain reset read-out operation HCGRRD, a first-conversion-gain read-out operation HCGSRD, a second-conversion-gain read-out operation LCGSRD, and a second-conversion-gain reset read-out operation LCGRRD.

The above description has outlined the configurations and functions of the parts of the solid-state imaging device 10. Next, a description will be hereinafter given of details of the configuration of the column processing system of the reading part 70 relating to the first embodiment, or the configuration of the pixel signal processing parts 400 and read-out operations related thereto.

Figure 4:
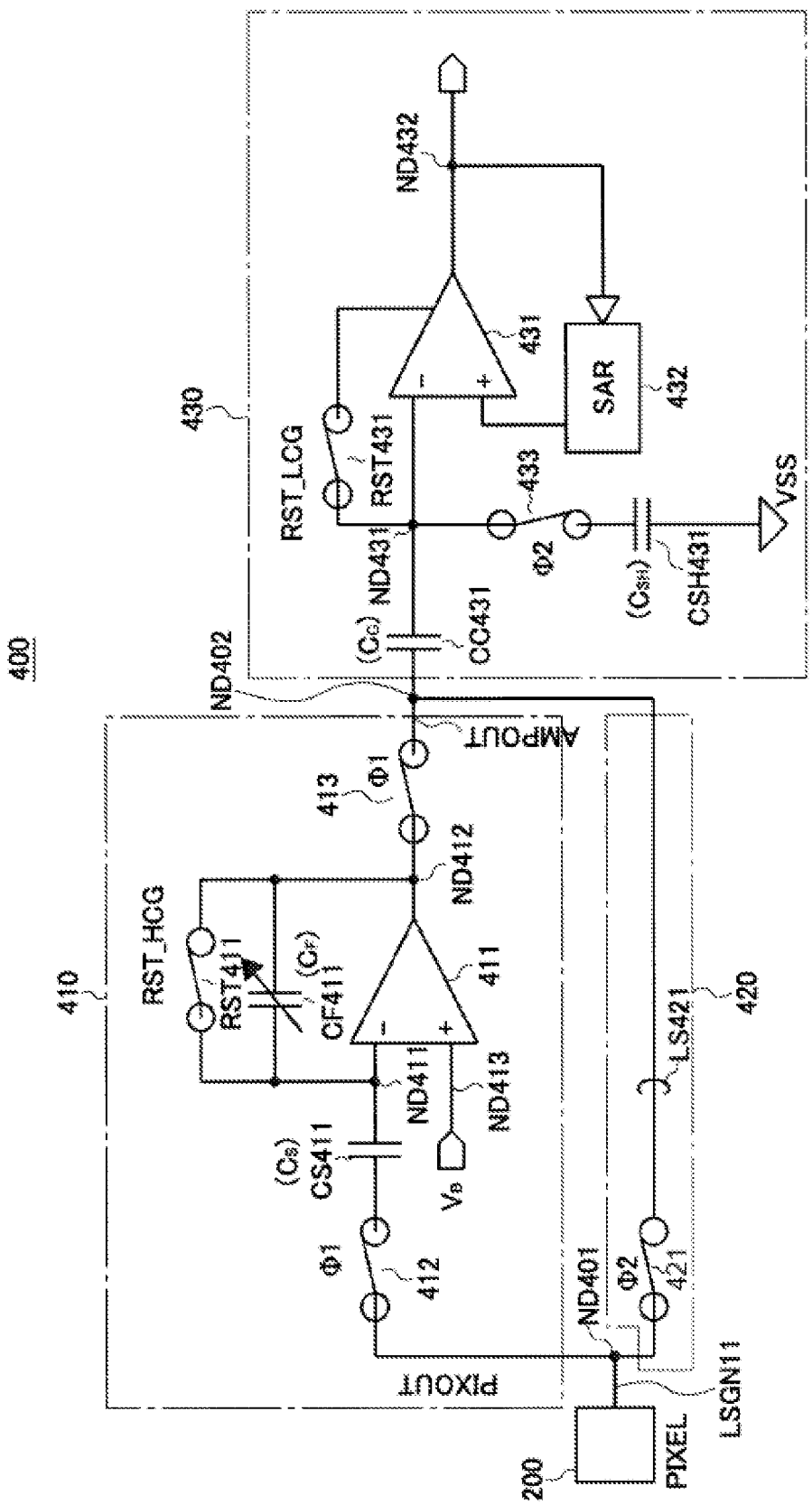
FIG. 4 is a circuit diagram showing an example configuration of a pixel signal processing part according to the first embodiment of the present invention.

FIG. 4 is a circuit diagram showing an example configuration of the pixel signal processing parts according to the first embodiment of the present invention.

The pixel signal processing parts 400, which are capable of amplifying and analog-to-digital converting the pixel signals read out from the readable pixels 200, each include an input node ND401, a connection node ND402, a first reading part 410, a second reading part 420 and an AD converting part 430, as shown in FIG. 4.

The input node ND401 receives the first-conversion-gain signal (HCGRST, HCGSIG) and the second-conversion-gain signal (LCGSIG, LCGRST) read out as the pixel signal PXLOUT from the readable pixel 200 onto the vertical signal line LSGN11, and feeds the input signals to the first and second reading parts 410 and 420.

The connection node ND402 is connected to the output terminal of the first reading part 410 and the output terminal of the second reading part 320, and also connected to the input terminal of the AD converting part 430 of the subsequent stage. The connection node ND402 feeds, to the AD converting part 430, the first-conversion-gain signal inverted by the first reading part 410 and the second-conversion-gain signal processed by the second reading part 420.

Of the pixel signal PIXOUT input into the input node ND401, the first reading part 410 inverts the signal direction (level transitioning direction) of the first-conversion-gain signal (HCGRST, HCGSIG) and outputs the inverted first-conversion-gain signal to the connection node ND402.

Of the pixel signal PIXOUT input into the input node ND401, the second reading part 420 keeps the signal direction (level transitioning direction) of the second-conversion-gain signal (LCGSIG, LCGRST) unchanged, and outputs the non-inverted second-conversion-gain signal to the connection node ND402.

The following describes the specific example configuration of the first and second reading parts 410 and 420 relating to the first embodiment with reference to FIG. 4.

(Example Configuration of First Reading Part 410)

The first reading part 410 includes a first operational amplifier (amplifier) 411 whose inverting input terminal (−)

is connected to the signal feeding line extending from the input node ND401. The inverting input terminal (−) of the amplifier 411, which is connected to the signal feeding line extending from the input node ND401, is connected to a first node ND411, the output terminal of the amplifier 411 is connected to a second node ND412, and the non-inverting input terminal (+) of the amplifier 411 is connected to a third node ND413. A first input switch 412 and a first sampling capacitor CS411 are connected in series between the input node ND401 and the first node ND411. A feedback capacitor CF411 is connected between the second node ND412 and the first node ND411. A first reset switch RST411, which is parallel to the feedback capacitor CF411, is connected between the second node ND412 and the first node ND411. An output switch 413 is connected between the second node ND412 and the connection node ND402. A third node ND413, which is connected to the non-inverting input terminal (+) of the amplifier 411, is connected to the reference potential VB.

The first input switch 412 is formed by, for example, a MOS transistor and is switched by a control signal φ1 between the conduction state and the non-conduction state. The first input switch 412 remains in the conduction state in the first-conversion-gain signal read-out mode with the control signal φ1 being fed at the high level, so that the first-conversion-gain signal (HCGRST, HCGSIG) input into the input node ND401 is input into the inverting input terminal (−) of the amplifier 411 via the first sampling capacitor CS411.

The output switch 413 is formed by, for example, a MOS transistor and is switched by a control signal φ1 between the conduction state and the non-conduction state. The output switch 413 remains in the conduction state in the first-conversion-gain signal read-out mode with the control signal φ1 being fed at the high level, so that the inverted first-conversion-gain signal (HCGRST, HCGSIG) produced by the inversion amplification performed by the amplifier 411 is input into the AD converting part 430 via the connection node ND402.

The first reset switch RST411 is switched between the conduction state and the non-conduction state by a control signal RST_HCG. The first reset switch RST411 remains in the conduction state in a predetermined start period in the first-conversion-gain signal read-out mode with the control signal RST_HCG being fed at the high level, so that the amplifier 411 is initialized.

(Example Configuration of Second Reading Part 420)

The second reading part 420 includes a second input switch 421 connected to a signal transfer line LS420 extending between the input node ND401 and the connection node ND402.

The second input switch 421 is formed by, for example, a MOS transistor and is switched by a control signal φ2 between the conduction state and the non-conduction state. The second input switch 421 remains in the conduction state in the second-conversion-gain signal read-out mode with the control signal φ2 being fed at the high level, so that the second-conversion-gain signal (LCGSIG, LCGRST) input into the input node ND401 is input into the AD converting part 430 via the connection node ND402.

<Example Configuration of AD Converting Part 430>

The AD converting part 430 includes a second operational amplifier (amplifier) 431 whose inverting input terminal (−) is connected to a signal feeding line extending from the connection node ND402. The inverting input terminal (−) of the amplifier 431, which is connected to the signal feeding line extending from the connection node ND402, is connected to an input node ND431, the output terminal is connected to an output node ND432, and a non-inverting input terminal (+) of the amplifier 431 is connected to the output side of a referential potential control circuit 432. A sampling capacitor CC431 serving as an input capacitor is connected between the connection node ND402 and the input node ND431. A third reset switch RST431 is connected between the output node ND432 and the input node ND431. A third switch 433 and a sampling capacitor CSH431 are connected in series between the input node ND431, which is connected to the inverting input terminal (−) of the amplifier 431, and the reference potential VSS.

The third input switch 433 is formed by, for example, a MOS transistor and is switched by a control signal φ2 between the conduction state and the non-conduction state. The third input switch 433 connects the sampling capacitor CSH431 to the sampling capacitor CC431 via the input node ND431 in the second-conversion-gain signal read-out mode. The presence of the sampling capacitor CSH431 makes it possible to adjust the amplitude of the pixel signal, in particular, to reduce (adjust) the amplitude of high-amplitude pixel signals to such a level that AD conversion can be performed. In this manner, the dynamic range can be increased.

The third reset switch RST431 is switched between the conduction state and the non-conduction state by a control signal RST_LCG. The third reset switch RST431 remains in the conduction state in a predetermined start period in the first-conversion-gain signal read-out mode with the control signal RST_LCG being fed at the high level, so that the amplifier 431 is initialized.

<Read-Out Operation in Solid-State Imaging Device 10>

The above has described the characteristic configurations and functions of the parts of the solid-state imaging device 10. Next, a detailed description will be given of the read-out operation performed to read the pixel signal in the solid-state imaging device 10 relating to the first embodiment.

Figure 5:
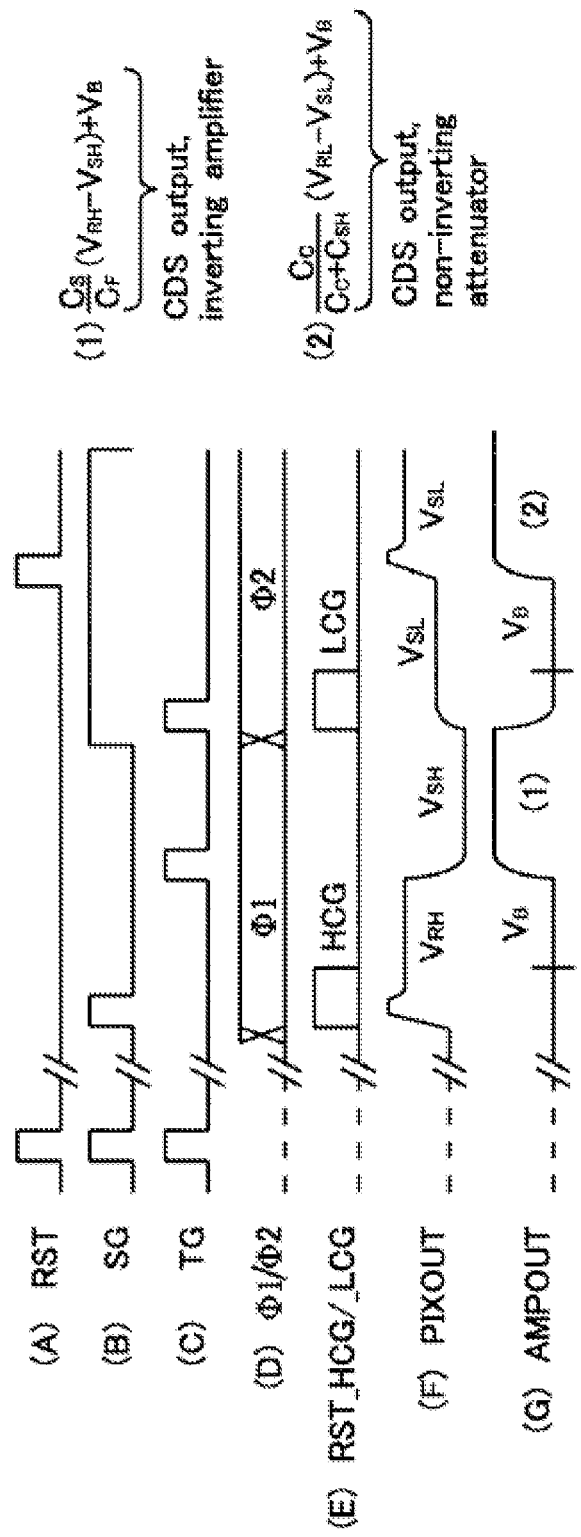
FIG. 5 is a timing chart to illustrate how to read a pixel signal from a readable pixel in a dual-conversion-gain read-out mode in the solid-state imaging device relating to the first embodiment of the present invention.

FIG. 5 is a timing chart including parts (A) to (G) to illustrate the read-out operation to read the pixel signal from the readable pixel in the dual-conversion-gain read-out mode in the solid-state imaging device relating to the first embodiment of the present invention.

In FIG. 5, the part (A) shows the control signal RST for the reset transistor RST11-Tr of the readable pixel 200, the part (B) shows the control signal SG for the storage transistor SG11-Tr of the readable pixel 200, and the part (C) shows the control signal TG for the transfer transistor TG11-Tr of the readable pixel 200. In FIG. 5, the part (D) shows the control signal φ1 for the first input switch 412 and the output switch 413 of the first reading part 410 of the pixel signal processing part 400, and the control signal φ2 for the second input switch 421 of the second reading part 420 and for the third input switch 433 of the AD converting part 430. In FIG. 5, the part (E) shows the control signal RST_HCG for the first reset switch RST411 of the first reading part 410 of the pixel signal processing part 400 and the control signal RST_LCG for the second reset switch RST431 of the AD converting part 430. In FIG. 5, the part (F) shows the pixel signal PIXOUT read from the readable pixel 200, and the part (G) shows the amplified output signal AMPOUT from the first and second reading parts 410 and 420 of the pixel signal processing part 400.

Before the dual-conversion-gain read-out mode MDCG starts, the control signals RST, SG and TG remain at the high level for a predetermined period of time, to keep the reset transistor RST11-Tr, the storage transistor SG11-Tr, and the transfer transistor TG11-Tr in the conduction state for a predetermined period of time. This resets the photodiode PD11, the floating diffusion FD11 and the storage capacitor CS11 to the fixed potential VAAPIX. In other words, a shutter operation is performed (the parts (A) to (C) in FIG. 5).

<Read-Out Operation in First-Conversion-Gain Signal Read-Out Mode>

At the timing when the transfer transistor TG11-Tr is switched from the conduction state to the non-conduction state, the exposure period PEXP starts and a read-out operation is performed in the first-conversion-gain signal read-out mode. After a certain period of time elapses since the start of the exposure period PEXP, the control signal SG is switched to and remains at the high level for a predetermined period of time. After this, a first read-out reset signal (HCGRST) starts to be read out. Since the control signal LG remains at the low level to keep the storage transistor SG11-Tr in the non-conduction state, the charges in the floating diffusion FD11 and the charges in the storage capacitor CS11 are separated from each other, so that the gain of the floating diffusion FD11 remains at the first conversion gain HCG corresponding to the first capacitance including the capacitance CFD of the floating diffusion FD11.

In a first reset signal read-out period following the resetting, the first read-out reset signal HCGRST, which is produced through conversion with the first conversion gain HCG corresponding to the first capacitance of the floating diffusion FD11, is read from the source follower transistor SF11-Tr to the vertical signal line LSGN11. The first read-out reset signal HCGRST is subject to a predetermined operation in the reading circuit 40 serving as a column processing circuit. In other words, a first-conversion-gain reset read-out operation HCGRRD is performed.

The first reset signal read-out period is followed by a first transfer period, in which the control signal TG is switched to the high level to keep the transfer transistor TG11-Tr in the conduction state, so that the charges stored in the photodiode PD11 are transferred to the floating diffusion FD11. After the first transfer period, the control signal TG is switched to the low level to switch the transfer transistor TG11-Tr into the non-conduction state.

The first transfer period is followed by a first signal read-out period, in which the first read-out signal HCGSIG, which is produced through conversion with the first conversion gain corresponding to the first capacitance of the floating diffusion FD11, is read from the source follower transistor SF11-Tr to the vertical signal line LSGN11. The first read-out signal HCGSIG is subject to a predetermined operation in the reading circuit 40 serving as the column processing circuit. In other words, a first-conversion-gain read-out operation HCGSRD is performed.

The reset level (VHCGRST, $V_{RH}$) and the signal level (VHCGSIG, $V_{SH}$) are held, or a digital CDS operation is performed based on the difference between the reset level and the signal level.

In the first-conversion-gain signal read-out mode, the reading circuit 40 performs the following operations. In the first-conversion-gain signal read-out mode, the control signal φ1 having the active high level is fed to the first input switch 412 and the output switch 413 of the first reading part 410 in the pixel signal processing part 400 of the reading circuit 40. On the other hand, in the first-conversion-gain signal read-out mode, the control signal φ2 having the non-active low level is fed to the second input switch 421 of the second reading part 420 in the pixel signal processing part 400 of the reading circuit 40. This means that, in the first-conversion-gain signal read-out mode, the first reading part 410 of the pixel signal processing part 400 is active, and the second reading part 420 is non-active.

In the first reading part 410, the control signal RST_HCG is fed at the high level in a predetermined start period in the first-conversion-gain signal read-out mode, so that the first reset switch RST411 is switched to the conduction state and the amplifier 411 is initialized. In the first-conversion-gain signal read-out mode, the first read-out reset signal HCGRST (potential $V_{RH}$), which is the first-conversion-gain signal, is input and then inverted by the amplifier 411.

In the first-conversion-gain signal read-out mode, since the control signals φ2 and RST_LCG fed to the third input switch 433 and the second reset switch RST431 indicate the non-active state, the AD converting part 430 performs AD conversion by comparing the output signal AMPOUT from the first reading part 410, which is fed to the inverting input terminal (−) of the amplifier 431, and a predetermined potential fed to the non-inverting input terminal (+).

In the first-conversion-gain signal read-out mode, the first reading part 410 serving as an amplifying part receives the first read-out reset signal HCGRST (potential $V_{RH}$) and subsequently receives the first read-out luminance signal HCGSIG (potential $V_{SH}$), which has a lower potential than the first read-out reset signal HCGRST. The first read-out reset signal HCGRST (potential $V_{RH}$) and the first read-out reset signal HCGRST are inverted and amplified by the amplifier 411 and then output to the subsequent stage or the AD converting part 430. The output signal AMPOUT from the amplifier 411 of the first reading part 410 is represented as $(V_B+G^*(V_{RH}-V_{SH}))$ obtained by amplifying the referential potential $V_B$ by the result of multiplying the difference between the first read-out reset signal HCGRST (potential $V_{RH}$) and the read-out luminance signal HCGSIG ($V_{SH}$) having a lower potential by the capacitance ratio G ($C_S/C_F$).

<Read-Out Operation in Second-Conversion-Gain Signal Read-Out Mode>

After the first-conversion-gain read-out operation HCGSRD, the control signal SG is switched from the low level to the high level, to place the storage transistor SG11-Tr into the conduction state and to connect the storage capacitor CS11 to the floating diffusion FD11. In this way, the charges in the floating diffusion FD11 and the charges in the storage capacitor CS11 are combined, so that the gain of the floating diffusion FD11 is switched to the second conversion gain LCG corresponding to the second capacitance. In this manner, the first-conversion-gain signal read-out mode ends and the second-conversion-gain signal read-out mode starts.

The first signal read-out period is followed by a second transfer period, in which the control signal TG is switched to the high level to keep the transfer transistor TG11-Tr in the conduction state, so that the charges stored in the photodiode PD11 are transferred to the floating diffusion FD11. After the second transfer period, the control signal TG is switched to the low level to switch the transfer transistor TG11-Tr into the non-conduction state. The first signal read-out period is followed by the second transfer period and then a second signal read-out period, in which the second read-out signal LCGSIG, which is produced through conversion with the second conversion gain LCG corresponding to the second capacitance of the floating diffusion FD11, is read from the source follower transistor SF11-Tr to the vertical signal line LSGN11. The second read-out signal LCGSIG is subject to a predetermined operation in the reading circuit 40 serving as the column processing circuit. In other words, a second-conversion-gain read-out operation LCGSRD is performed.

After the second signal read-out period has elapsed, the control signal RST is switched to the high level to switch the reset transistor RST11-Tr into the conduction state. In this way, the second reset signal read-out period begins. In the second reset signal read-out period, the second read-out reset signal LCGRST, which is produced through conversion with the second conversion gain LCG corresponding to the second capacitance of the floating diffusion FD11, is read from the source follower transistor SF11-Tr to the vertical signal line LSGN11. The second read-out reset signal LCGRST is subject to a predetermined operation in the reading circuit 40 serving as the column processing circuit. In other words, a second-conversion-gain reset read-out operation HCGRRD is performed.

The reset level (LCGRST, $V_{RL}$) and the signal level (LCGSIG, $V_{SL}$) are held, or an offset noise cancel operation is performed based on the difference between the reset level LCGRST ($V_{RL}$) and the signal level LCGSIG ($V_{SL}$).

In the second-conversion-gain signal read-out mode, the reading circuit 40 performs the following operations. In the second-conversion-gain signal read-out mode, the control signal φ1 fed to the first input switch 412 and the output switch 413 of the first reading part 410 in the pixel signal processing part 400 of the reading circuit 40 is non-active or at the low level. On the other hand, in the second-conversion-gain signal read-out mode, the control signal φ2 fed to the second input switch 421 of the second reading part 420 in the pixel signal processing part 400 of the reading circuit 40 is held active or at the high level. This means that, in the second-conversion-gain signal read-out mode, the first reading part 410 of the pixel signal processing part 400 is non-active, and the second reading part 420 is active. This allows the amplifier 411 of the first reading part 410 to remain turned-off during the second-conversion-gain signal read-out mode, thereby achieving reduced power consumption.

In the second-conversion-gain signal read-out mode, since the control signals φ2 and RST_LCG fed to the third input switch 433 and the second reset switch RST431 indicates the active state, the AD converting part 430 performs the following operation on the output signal AMPOUT from the second reading part 420, which is fed to the inverting input terminal (−) of the amplifier 431.

In the second-conversion-gain signal read-out mode, the second reading part 420 serving as an attenuator and the amplifier 431 of the AD converting part 430 receive the second read-out luminance signal LCGSIG (potential $V_{SL}$), which has not been inverted, and subsequently receive the second read-out reset signal LCGRST (potential $V_{RL}$). The output signal AMPOUT from the amplifier 431 of the AD converting part 430 is represented as $(V_B + G^*(V_{RL} - V_{SL}))$ obtained by attenuating the referential potential $V_B$ by the result of multiplying the difference between the second read-out luminance signal LCGSIG (potential $V_{SL}$) and the second read-out reset signal LCGRST ($V_{RL}$) by the capacitance ratio G ($C_C/(C_C + C_{SH})$).

As described above, in the first embodiment, the pixel signal processing part 400, which is capable of performing AD conversion, includes the input node ND401, the connection node ND402, the first reading part 410, the second reading part 420 and the AD converting part 430, as shown in FIG. 4. Of the pixel signal PIXOUT input into the input node ND401, the first reading part 410 inverts the signal direction (level transitioning direction) of the first-conversion-gain signal (HCGRST, HCGSIG) and outputs the inverted first-conversion-gain signal (HCGRST, HCGSIG), which has been subjected to inversion and amplification, to the AD converting part 430 via the connection node ND402. Of the pixel signal PIXOUT input into the input node ND401, the second reading part 420 keeps the signal direction (level transitioning direction) of the second-conversion-gain signal (LCGSIG, LCGRST) unchanged, and outputs the non-inverted second-conversion-gain signal (LCGSIG, LCGRST) to the AD converting part 430 via the connection node ND402. The presence of the sampling capacitor CSH431 in the AD converting part 430 makes it possible to adjust the amplitude of the pixel signal, in particular, to reduce (adjust) the amplitude of high-amplitude pixel signals to such a level that AD conversion can be performed. In this manner, the dynamic range can be increased.

According to the first embodiment described above, signals can be read out even when produced with different conversion gains and having different signal directions. The first embodiment can not only allow signals to be read out even when they are produced with different conversion gains and have different signal directions but also reduce an increase in power consumption and circuit areas, achieve an increased dynamic range, and thus accomplish high image quality. In the second-conversion-gain signal read-out mode, the first reading part 410 of the pixel signal processing part 400 remains non-active, and the second reading part 420 remains active. This allows the amplifier 411 of the first reading part 410 to remain turned-off during the second-conversion-gain signal read-out mode, thereby achieving reduced power consumption. In addition, the AD converting part 430 can receive the inverted first-conversion-gain signal and the non-inverted second-conversion-gain signal, which have the same direction. Accordingly, existing ADCs can be used without requiring overhead to convert the input inverted first-conversion-gain signal and non-inverted second-conversion-gain signal, which can contribute to reduce the cost of camera systems to which the solid-state imaging device 10 is applicable.

Second Embodiment

Figure 6:
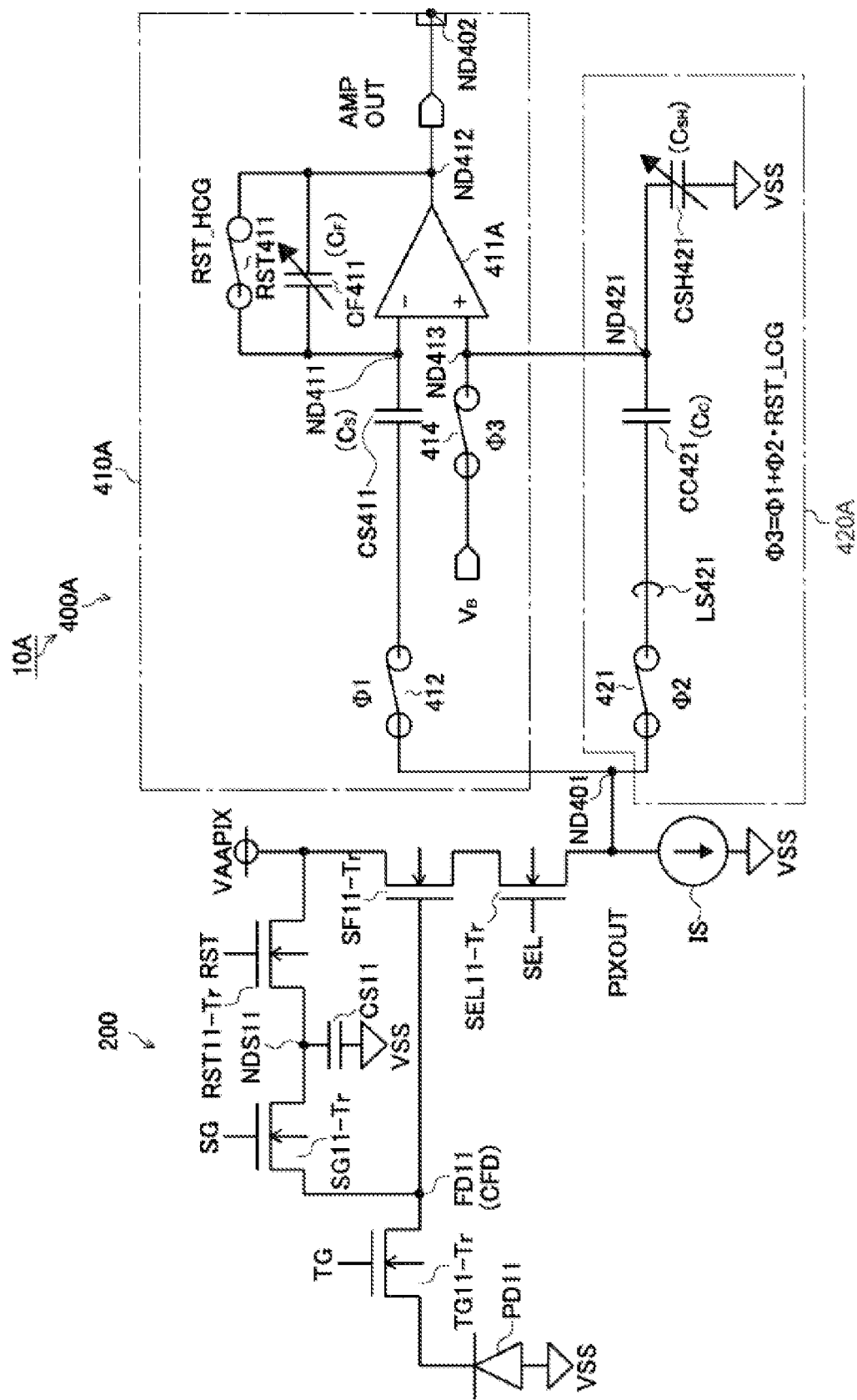
FIG. 6 is a circuit diagram showing an example configuration of main parts of a pixel signal processing part relating to a second embodiment of the present invention.
Figure 7:
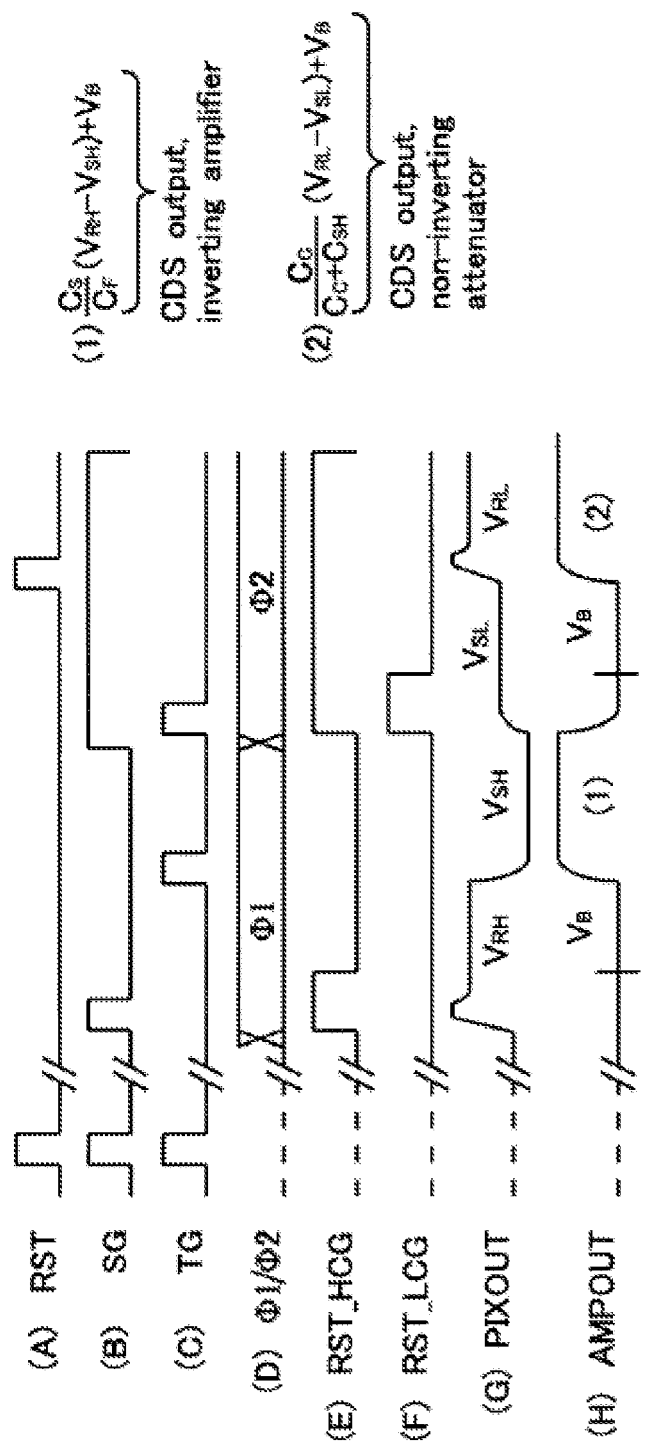
FIG. 7 is a timing chart to illustrate how to read a pixel signal from a readable pixel in a dual-conversion-gain read-out mode in a solid-state imaging device relating to the second embodiment of the present invention.

FIG. 6 is a circuit diagram showing an example configuration of main parts of a pixel signal processing part relating to a second embodiment of the present invention. FIG. 7 is a timing chart including parts (A) to (H) to illustrate how to read a pixel signal from a readable pixel in a dual-conversion-gain read-out mode in a solid-state imaging device relating to the second embodiment.

In FIG. 7, the part (A) shows the control signal RST for the reset transistor RST11-Tr of the readable pixel 200, the part (B) shows the control signal SG for the storage transistor SG11-Tr of the readable pixel 200, and the part (C) shows the control signal TG for the transfer transistor TG11-Tr of the readable pixel 200. In FIG. 7, the part (D) shows the control signal φ1 for the first input switch 412 of the first reading part 410 of the pixel signal processing part 400, and the control signal φ2 for the second input switch 421 of the second reading part 420. In FIG. 7, the part (E) shows the control signal RST_HCG for the first reset switch RST411 of the first reading part 410 of the pixel signal processing part 400, and the part (F) shows the control signal RST_LCG for the second reset switch RST412 of the AD converting part 430. In FIG. 7, the part (G) shows the pixel signal PIXOUT read from the readable pixel 200, and the part (H) shows the amplified output signal AMPOUT from the first and second reading parts 410 and 420 of the pixel signal processing part 400.

A pixel signal processing part 400A relating to the second embodiment differs from the pixel signal processing part 400 relating to the first embodiment in terms of the following points.

In the pixel signal processing part 400 of the first embodiment, the first reading part 410 has the amplifier 411, but the second reading part 420 has no amplifier. The signal transfer line LS421 connected to the second input switch 421 is connected to the connection node ND402 and serves as an attenuator. The first and second reading parts 410 and 420 do not share the amplifier 411 but independently and separately process the first-conversion-gain signal (HCGRST, HCGSIG) and the second-conversion-gain signal (LCGSIG, LCGRST). The first reading part 410 inverts and amplifies the first-conversion-gain signal, and the second reading part 420 does not invert but attenuate the second-conversion-gain signal.

In the pixel signal processing part 400A relating to the second embodiment, on the other hand, an amplifier 411A is shared between a first reading part 410A and a second reading part 420A. More specifically, in the first reading part 410A, a fourth input switch 414 is connected between the reference potential VB and the third node ND413, which is connected to the non-inverting input terminal (+) of the amplifier 411A. In the second reading part 420A, on the other hand, the signal transfer line LS421 connected to the second input switch 421 is connected to, instead of the connection node ND402, the third node ND413, which is connected to the non-inverting input terminal (+) of the amplifier 411A. Furthermore, in the second reading part 420A, a second sampling capacitor CC421 is connected between the second input switch 421 and the third node ND413. In addition, an attenuation capacitor CSH421 is connected between the reference potential VSS and a fifth node ND421, which is a connection node between the third node ND413 and the second sampling capacitor CC421.

The fourth input switch 414 is formed by, for example, a MOS transistor and is switched by a control signal φ3 between the conduction state and the non-conduction state. The fourth input switch 414 remains in the conduction state in a predetermined start period in the first-conversion-gain signal read-out mode or in the second-conversion-gain signal read-out mode with the control signal φ3 being fed at the high level, so that the reference potential VB is connected to the non-inverting input terminal (+) of the amplifier 411A.

According to the second embodiment, in the second-conversion-gain signal read-out mode, the second sampling capacitor CC421 and the attenuation capacitor CSH421 serve as an attenuator for attenuating the second-conversion-gain signal (LCGSIG, LCGRST). The output from this attenuator is fed to the non-inverting input terminal (+) of the amplifier 411A and buffered in the non-inverting unity-gain amplifier constituted by the non-inverting input terminal (+).

The second embodiment can not only allow signals to be read even when they are produced with different conversion gains and having different signal directions but also reduce an increase in power consumption and circuit areas, achieve an increased dynamic range, and thus accomplish high image quality, like the first embodiment described above.

Third Embodiment

Figure 8:
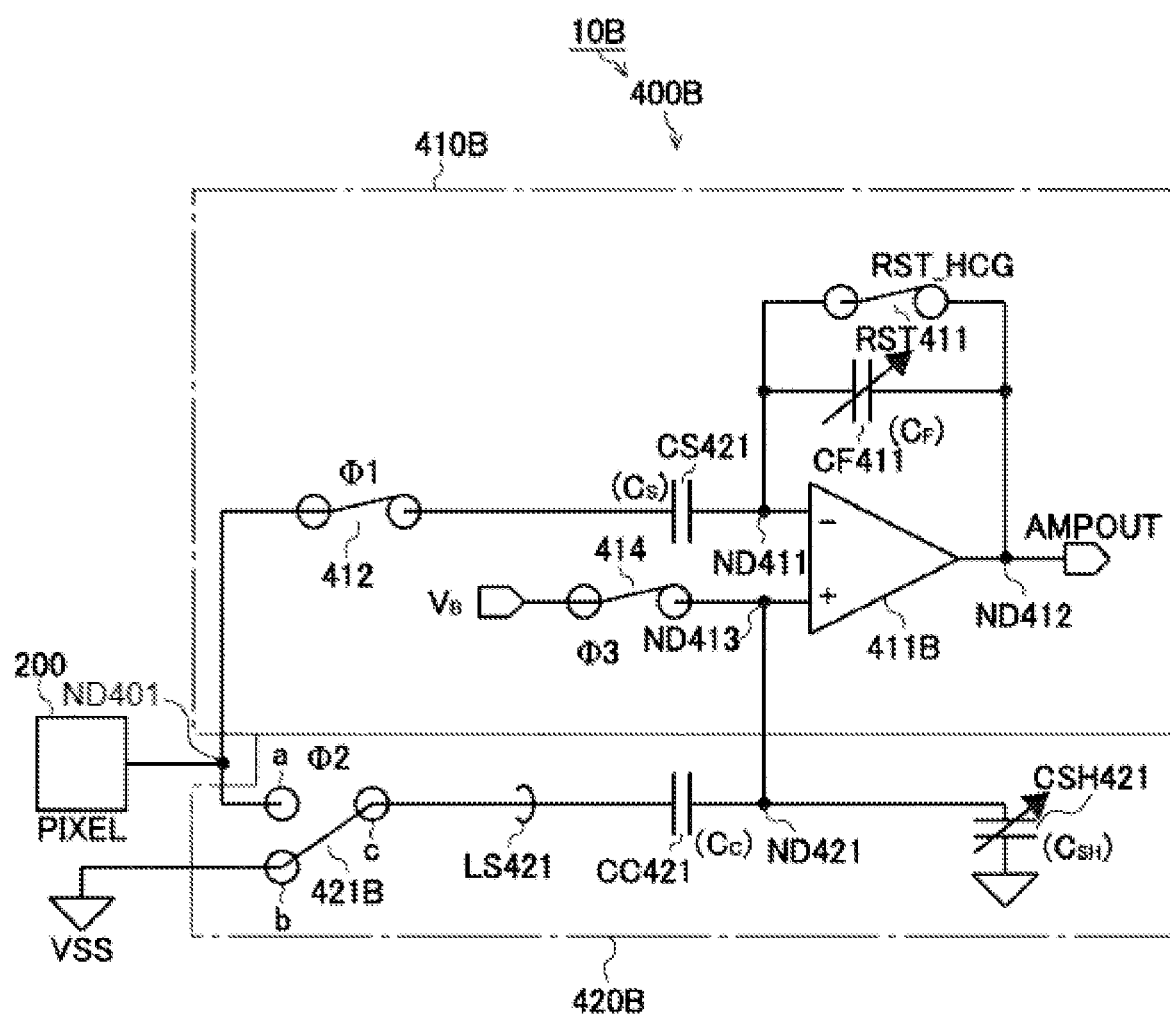
FIG. 8 is a circuit diagram showing an example configuration of main parts of a pixel signal processing part relating to a third embodiment of the present invention.
Figure 9:
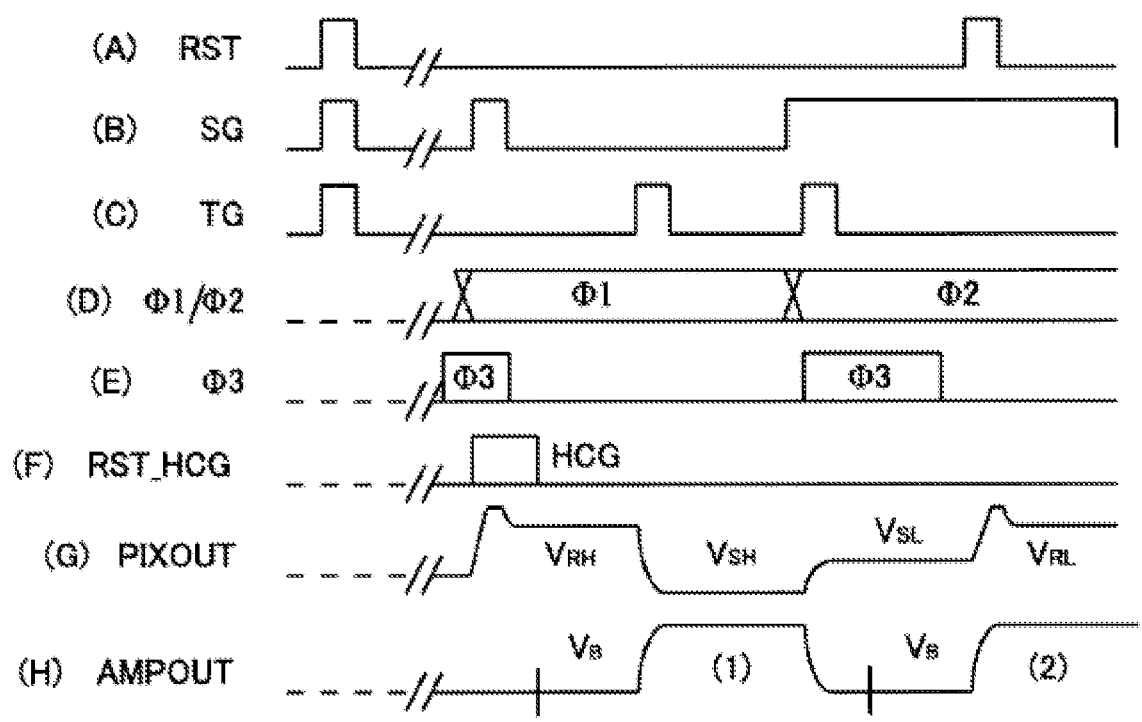
FIG. 9 is a timing chart to illustrate how to read a pixel signal from a readable pixel in a dual-conversion-gain read-out mode in a solid-state imaging device relating to the third embodiment of the present invention.

FIG. 8 is a circuit diagram showing an example configuration of main parts of a pixel signal processing part according to a third embodiment of the present invention. FIG. 9 is a timing chart including parts (A) to (H) to illustrate how to read a pixel signal from a readable pixel in a dual-conversion-gain read-out mode in a solid-state imaging device relating to the third embodiment of the present invention.

In FIG. 9, the part (A) shows the control signal RST for the reset transistor RST11-Tr of the readable pixel 200, the part (B) shows the control signal for the storage transistor SG11-Tr of the readable pixel 200, and the part (C) shows the control signal TG for the transfer transistor TG11-Tr of the readable pixel 200. In FIG. 9, the part (D) shows the control signal φ1 for the first input switch 412 of a first reading part 410B of a pixel signal processing part 400B and a control signal φ2 for a second input switch 421B of a second reading part 420B. In FIG. 9, the part (E) shows the control signal φ3 for the fourth switch 414 of the first reading part 410B of the pixel signal processing part 400B. In FIG. 9, the part (F) shows the control signal RST_HCG for the first reset switch RST411 of the first reading part 410B of the pixel signal processing part 400B. In FIG. 9, the part (G) shows the pixel signal PIXOUT read from the readable pixel 200, and the part (H) shows the amplified output signal AMPOUT from the first and second reading parts 410B and 420B of the pixel signal processing part 400B.

The pixel signal processing part 400B relating to the third embodiment differs from the pixel signal processing part 400A relating to the second embodiment in terms of the following points.

In the pixel signal processing part 400B relating to the third embodiment, during the read-out operation in the first-conversion-gain signal read-out mode, the signal transfer line LS421 of the second reading part 420B is connected to the reference potential VSS, which is the ground for the pixels, and the sum of the capacitances of the sampling capacitor CC421 and the attenuation capacitor CSH421 (CC+CSH) is input into the non-inverting input terminal (+) of the amplifier 411B, so that a balance is established between the capacitance input into the non-inverting input terminal (+) and the capacitance CS of the first sampling capacitor CS421 connected to the inverting input terminal (−).

In the pixel signal processing part 400B relating to the third embodiment, the second input switch 421B has a terminal a connected to a terminal input node ND401, a terminal b connected to the reference potential VSS, and a terminal c connected to the signal transfer line LS421. When the control signal φ2 is at the high level, the terminal c is connected to the terminal a. When the control signal φ2 is at the low level, the terminal c is connected to the terminal b.

According to the third embodiment, in the first-conversion-gain signal read-out mode, the capacitance input to the non-inverting input terminal (+) is controlled to be substantially equal to the capacitance (CC+CSH) so as to establish a balance between the input capacitance at the non-inverting input terminal (+) and the capacitance CS, and the fluctuation of the ground for the pixels is canceled by the differential action of the amplifier 411B.

In the pixel signal processing part 400B relating to the third embodiment, during the read-out operation in the first-conversion-gain signal read-out mode, the signal transfer line LS421 of the second reading part 420B is connected to the reference potential VSS, which is the ground for the pixels, and the sum of the capacitances of the sampling capacitor CC421 and the attenuation capacitor CSH421 (CC+CSH) is input into the non-inverting input terminal (+)

of the amplifier 411B, so that a balance is established between the capacitance input into the non-inverting input terminal (+) and the capacitance CS of the first sampling capacitor CS421 connected to the inverting input terminal (−). In the second-conversion-gain signal read-out mode, on the other hand, the signal transfer line LS421 of the second reading pat 420B is connected to the input node ND401, and the second sampling capacitor CC421 and the attenuation capacitor CSH421, which is connected to the reference potential serving as the analog ground, serve as an attenuator for attenuating the second-conversion-gain signal (LCGSIG, LCGRST). The output from this attenuator is fed to the non-inverting input terminal (+) of the amplifier 411B and buffered in the non-inverting unity-gain amplifier constituted by the non-inverting input terminal (+).

The third embodiment can not only produce the same effects as the above-described second embodiment but also cancel, for example, the column-wise ground (GND) floating and eventually reduce noise such as shading, since the signals input to the so-called pixel ground noise canceling circuits are fed to the non-inverting input terminal (+) of the amplifier 411B via the sampling capacitors CSH421. In other words, the third embodiment can provide for what is called the ground bounce cancellation (GBC).

Fourth Embodiment

Figure 10:
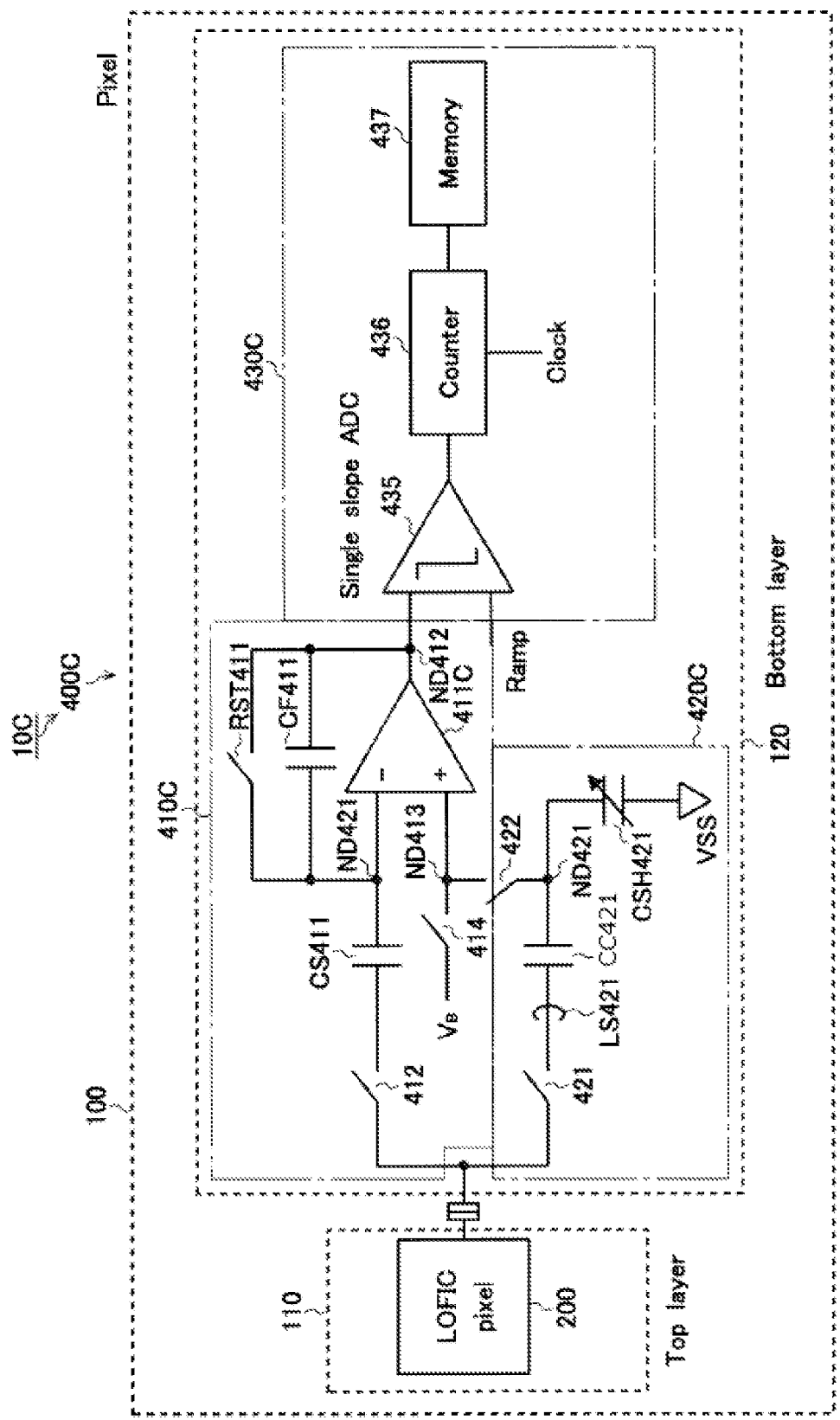
FIG. 10 is a block diagram showing, as an example, the configuration of main parts of a pixel signal processing part relating to a fourth embodiment of the present invention and the stacked structure of the pixel and the pixel signal processing part.

FIG. 10 is a block diagram showing, as an example, the configuration of main parts of a pixel signal processing part relating to a fourth embodiment of the present invention and the stacked structure of the pixel and the pixel signal processing part.

A pixel signal processing part 400C relating to the fourth embodiment differs from the pixel signal processing part 400A relating to the second embodiment in terms of the following points. In the pixel signal processing part 400C of the fourth embodiment, a fifth switch 422 is connected between the third node ND413, which is connected to the non-inverting input terminal (+) of the amplifier 411C and the fifth node ND421, which is connected to the capacitors CC421 and CSH421. The fifth switch 422 is controlled by the control signals φ1 and φ2 as to whether it is in the conduction or non-conduction state.

In the pixel signal processing part 400C relating to the fourth embodiment, during the read-out operation in the first-conversion-gain signal read-out mode, the signal transfer line LS421 of the second reading part 420C is connected to the reference potential, and the sum of the capacitances of the fourth sampling capacitor CC421 and the attenuation capacitor CSH421 (CC+CSH) is input into the non-inventing input terminal (+) of the amplifier 411C, so that a balance is established between the capacitance input into the non-inverting input terminal (+) and the capacitance CS of the first sampling capacitor CS411 connected to the inverting input terminal (−).

According to the fourth embodiment, in the first-conversion-gain signal read-out mode, the capacitance input into the non-inverting input terminal (+) is controlled to be substantially equal to the capacitance (CC+CSH) so as to establish a balance between the input capacitance at the non-inverting input terminal (+) and the capacitance CS, and the fluctuation of the ground for the pixels is canceled by the differential action of the amplifier 411C.

In the pixel signal processing part 400C relating to the fourth embodiment, during a read-out operation in the first-conversion-gain signal read-out mode, the signal transfer line LS421 of the second reading part 420C is connected to the reference potential VSS, which is the ground for the pixels, and the sum of the capacitances of the sampling capacitor CC421 and the attenuation capacitor CSH421 (CC+CSH) is input into the non-inverting input terminal (+) of the amplifier 411C, so that a balance is established between the capacitance input into the non-inverting input terminal (+) and the capacitance CS of the first sampling capacitor CS411 connected to the inverting input terminal (−). In the second-conversion-gain signal read-out mode, on the other hand, the signal transfer line LS421 of the second reading part 420C is connected to the input node ND401, and the second sampling capacitor CC421 and the attenuation capacitor CSH421, which is connected to the reference potential of the analog ground, serve as an attenuator for attenuating the second-conversion-gain signal (LCGSIG, LCGRST). The output from this attenuator is fed to the non-inverting input terminal (+) of the amplifier 411C, and buffered in the non-inverting unity-gain amplifier constituted by the non-inverting input terminal (+).

The fourth embodiment can not only produce the same effects as the above-described second embodiment but also cancel, for example, the column-wise ground (GND) floating and eventually reduce noise such as shading, since the signals input to the so-called pixel ground noise canceling circuits are fed to the non-inverting input terminal (+) of the amplifier 411C via the attenuation capacitor CSH421. In other words, the fourth embodiment can provide for what is called the ground bounce cancellation (GBC).

In the fourth embodiment, an AD converting part 430C is constituted by a single-slope ADC including a comparator 435, a counter 436, and a memory 437. The comparator 435 is configured to compare the output signal from the amplifier 411C of the first reading part 410C against a ramp signal RAMP having a slope waveform linearly changing at a certain gradient, to output a signal at, for example, the high level until the output signal and the ramp signal cross each other. The AD converting part 430C retains the duration in which the signal remains at the high level in the counter 436, to perform AD conversion.

(Stacked Structure of Pixel and Pixel Signal Processing Part)

The solid-state imaging device 10C relating to the fourth embodiment has a stacked structure of the readable pixel 200 and the pixel signal processing part 400C. The solid-state imaging device 10C relating to the fourth embodiment has a stacked structure of a first substrate (an upper substrate) 110 and a second substrate (a lower substrate) 120. The solid-state imaging device 10C is formed as an imaging device having a stacked structure that is obtained, for example, by bonding wafers together and subjecting the bonded wafers to dicing. In the present example, the first substrate 110 is stacked on the second substrate 120.

The first substrate 110 has the readable pixels 200 formed therein, and the second substrate 120 has the pixel signal processing parts 400C formed therein.

In the above-described stacked structure, the output nodes of the readable pixels 200 in the first substrate 110 are electrically connected to the input nodes ND401 of the pixel signal processing parts 400C in the second substrate 120 through vias (die-to-die vias), microbumps, or the like as shown in FIG. 10, for example.

Fifth Embodiment

Figure 11:
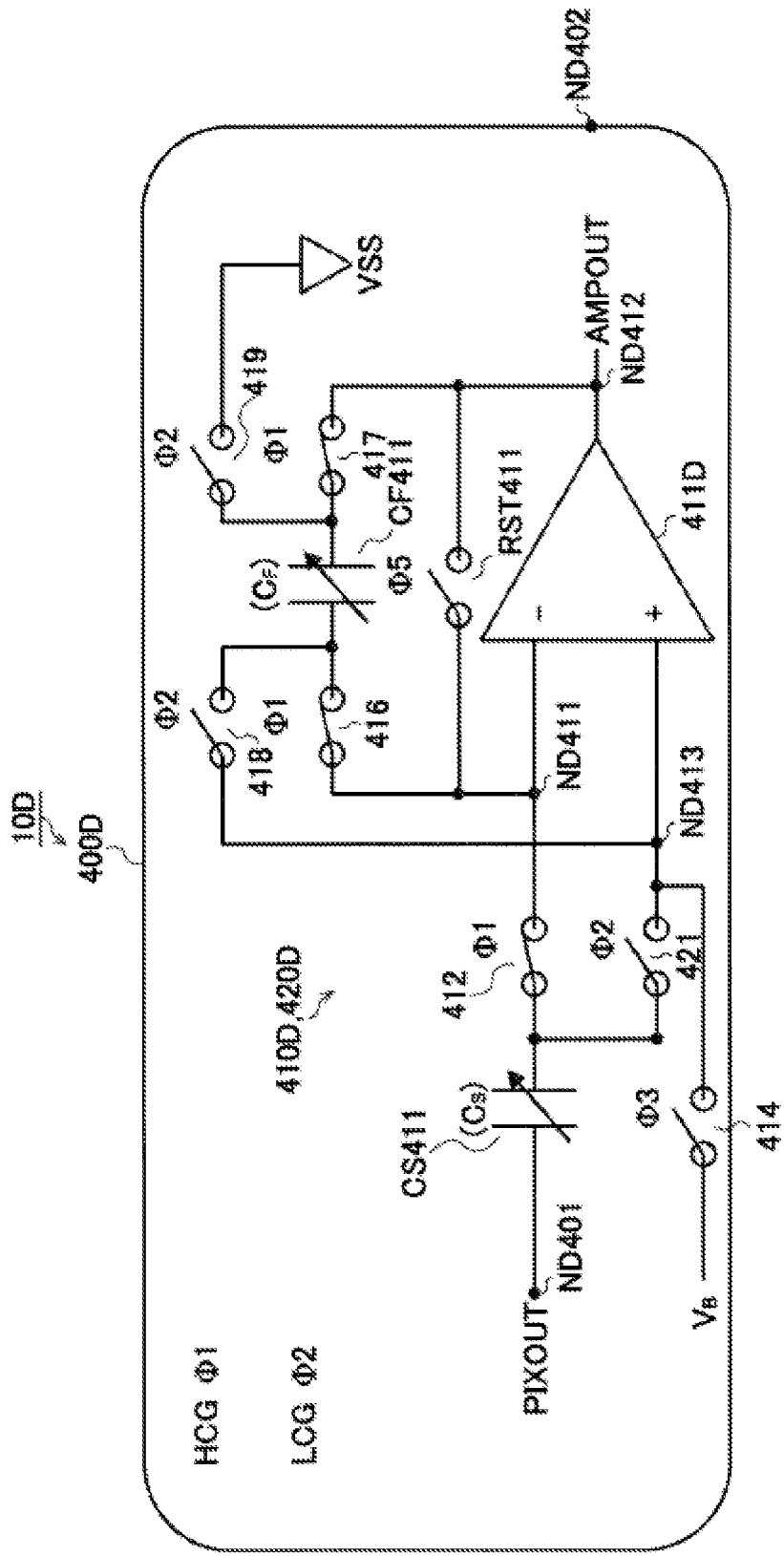
FIG. 11 is a circuit diagram showing an example configuration of a pixel signal processing part according to a fifth embodiment of the present invention.
Figure 12:
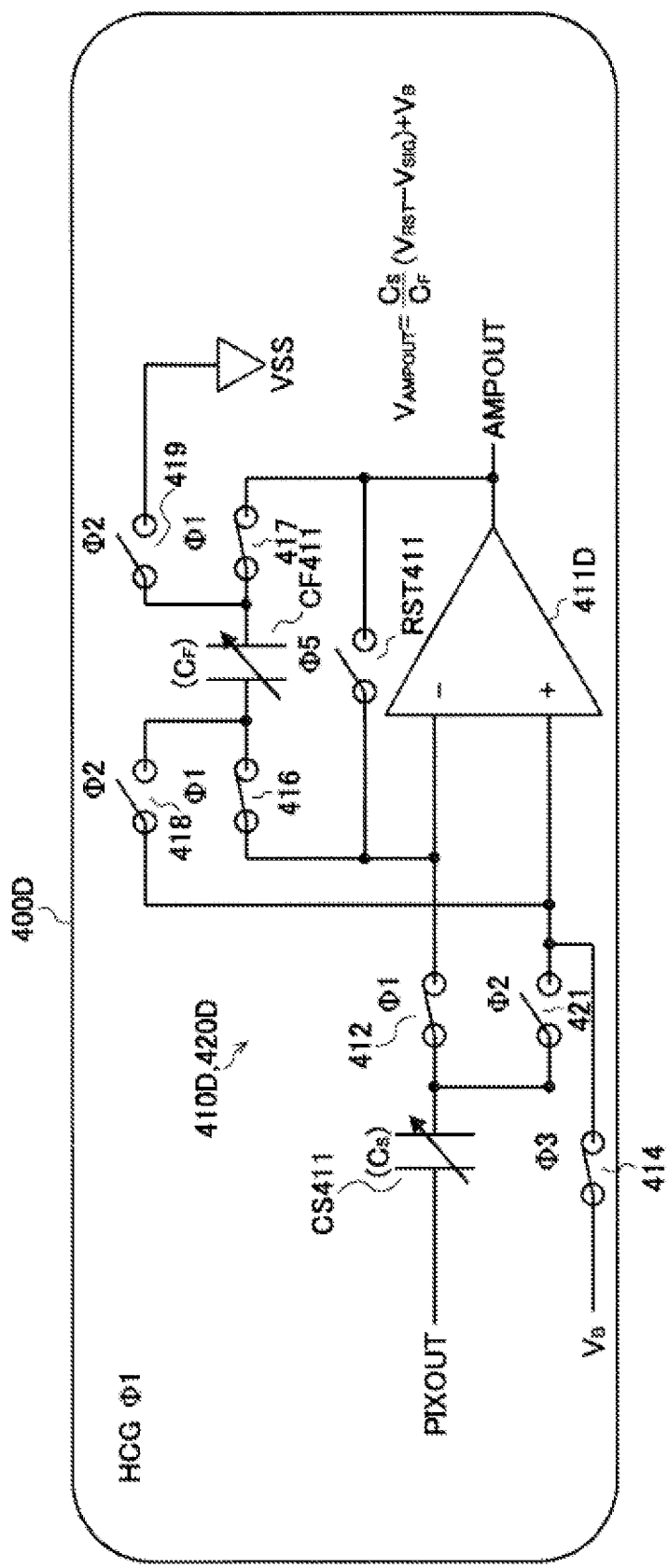
FIG. 12 is a circuit diagram to illustrate an active circuit in a first-conversion-gain signal read-out mode in the pixel signal processing part according to the fifth embodiment of the present invention.
Figure 13:
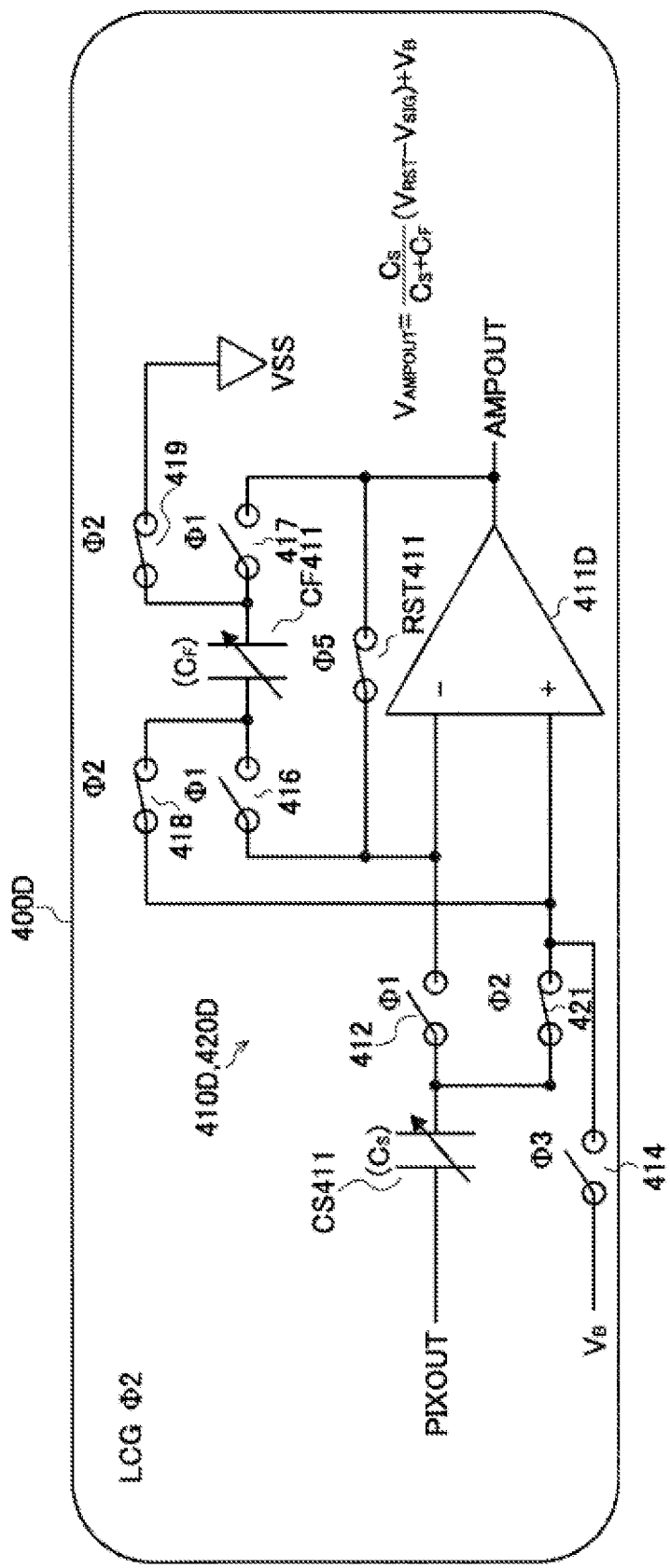
FIG. 13 is a circuit diagram to illustrate an active circuit in a second-conversion-gain signal read-out mode in the pixel signal processing part according to the fifth embodiment of the present invention.

FIG. 11 is a circuit diagram showing an example configuration of a pixel signal processing part according to a fifth embodiment of the present invention. FIG. 12 is a circuit diagram to illustrate an active circuit in a firstconversion-gain signal read-out mode in a pixel signal processing part according to the fifth embodiment of the present invention. FIG. 13 is a circuit diagram to illustrate an active circuit in a second-conversion-gain signal read-out mode in the pixel signal processing part according to the fifth embodiment of the present invention.

A pixel signal processing part 400D of the fifth embodiment differs from the pixel signal processing part 400A of the second embodiment in terms of the following points. In the pixel signal processing part 400D relating to the fifth embodiment, the first and second sampling capacitors CS411 and CC421 are formed by a single capacitor, which is shared between the first and second reading parts 410D and 420D, and the feedback and attenuation capacitor CF411 and CSH421 are formed by a single capacitor, which is shared between the first and second reading parts 410D and 420D. In the present example, the first sampling capacitor CS411 and the feedback capacitor CF411 are used.

In the pixel signal processing part 400D relating to the fifth embodiment, the constituents are connected to each other in the following manner.

In the pixel signal processing part 400D, the input node ND401 is connected to the sampling capacitor CS411, the first input switch 412 is connected between the sampling capacitor CS411 and the first node ND411, which is connected to the inverting input terminal (−) of an amplifier 411D serving as a first operational amplifier, and the second input switch 421 is connected between the sampling capacitor CS411 and the third node ND413, which is connected to the non-inverting input terminal (+) of the amplifier 411D. The feedback capacitor CF411 is connected between the second node ND412, which is connected to the output terminal of the amplifier 411D, and the first node ND411, which is connected to the inverting input terminal (−), and the reset switch RST411 is connected between the second node ND 412, which is connected to the output terminal of the amplifier 411D, and the first node ND411, which is connected to the inverting input terminal (−). A sixth switch 416 is connected between one of the electrodes of the feedback capacitor CF411 and the first node ND411, which is connected to the inverting input terminal (−) of the amplifier 411D, a seventh switch 417 is connected between the other electrode of the feedback capacitor CF411 and the second node ND412, which is connected to the output terminal of the amplifier 411D, an eighth switch 418 is connected between one of the electrodes of the feedback capacitor CF411 and the third node ND413, which is connected to the non-inverting input terminal (+) of the amplifier 411D, a ninth switch 419 is connected between the other electrode of the feedback capacitor CF411 and the reference potential VSS, and the third switch 414 is connected between the referential potential VB and the third node ND413, which is connected to the non-inverting input terminal (+) of the amplifier 411D.

With the above-described configuration, in the first-conversion-gain signal read-out mode, the first input switch 412, the third switch 414, the sixth switch 416, and the seventh switch 417 remain in the conduction state as shown in FIG. 12. On the other hand, the second input switch 421, the reset switch RST411, the eighth switch 418, and the ninth switch 419 remain in the non-conduction state.

In the second-conversion-gain signal read-out mode, the first input switch 412, the third switch 414, the sixth switch 416, and the seventh switch 417 remain in the non-conduction state as shown in FIG. 13. On the other hand, the second input switch 421, the reset switch RST411, the eighth switch 418, and the ninth switch 419 remain in the conduction state.

The fifth embodiment can not only produce the same effects as the above-described second embodiment but also achieve a smaller number of parts, a reduced pixel size and eventually a simplified stacked structure. For example, in the stacked structure, when one of the sampling capacitor CS411 and the feedback capacitor CF411 is placed on the upper first substrate 110, the other of the feedback capacitor CF411 and the sampling capacitor CS411 is placed on the lower second substrate 129.

Sixth Embodiment

Figure 14:
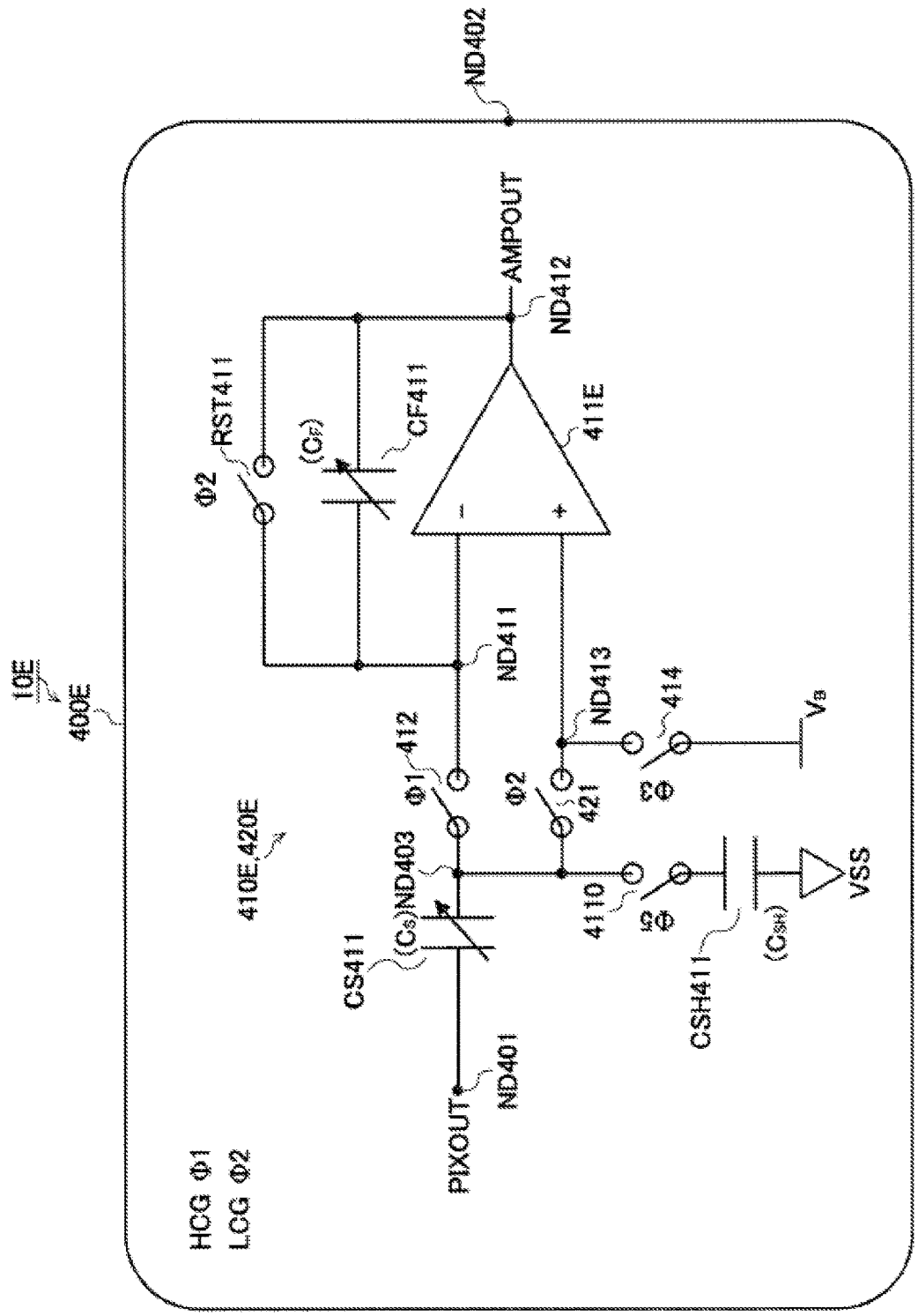
FIG. 14 is a circuit diagram showing an example configuration of a pixel signal processing part according to a sixth embodiment of the present invention.
Figure 15:
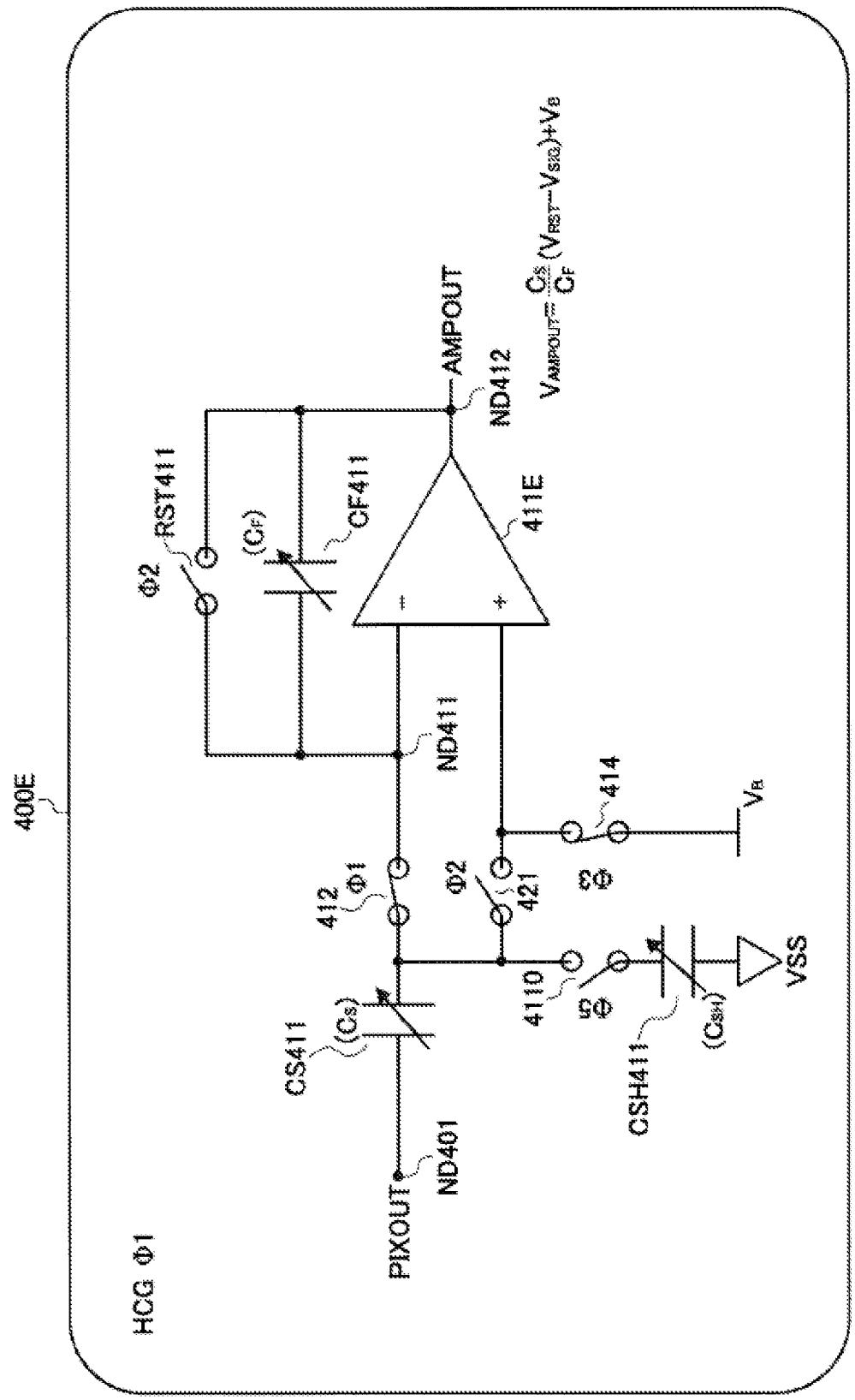
FIG. 15 is a circuit diagram to illustrate an active circuit in a first-conversion-gain signal read-out mode in the pixel signal processing part according to the sixth embodiment of the present invention.
Figure 16:
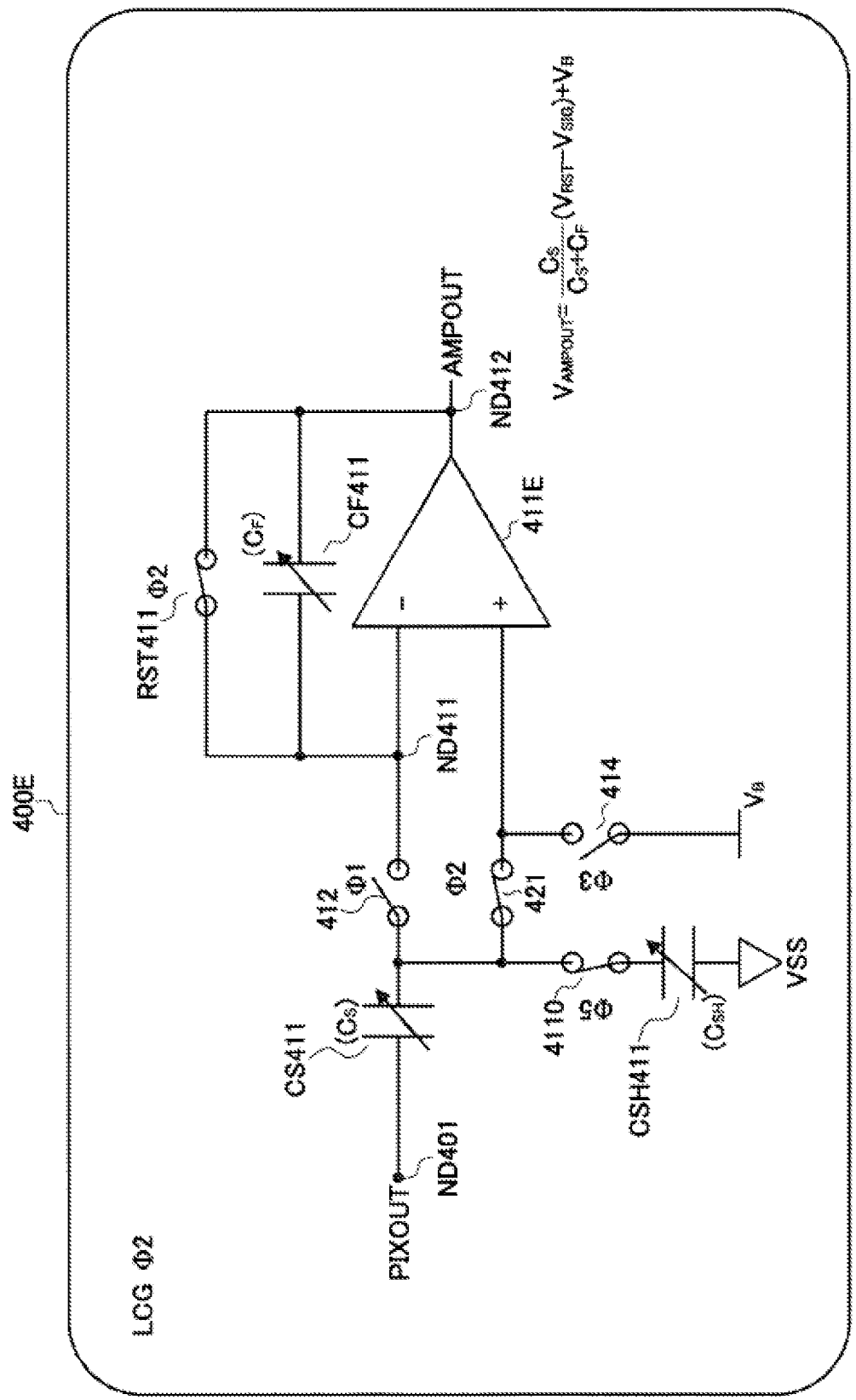
FIG. 16 is a circuit diagram to illustrate an active circuit in a second-conversion-gain signal read-out mode in the pixel signal processing part according to the sixth embodiment of the present invention.

FIG. 14 is a circuit diagram showing an example configuration of a pixel signal processing part according to a sixth embodiment of the present invention. FIG. 15 is a circuit diagram to illustrate an active circuit in a first-conversion-gain signal read-out mode in a pixel signal processing part according to the sixth embodiment of the present invention. FIG. 16 is a circuit diagram to illustrate an active circuit in a second-conversion-gain signal read-out mode in the pixel signal processing part according to the sixth embodiment of the present invention.

A pixel signal processing part 400E relating to the sixth embodiment differs from the pixel signal processing part 400A relating to the second embodiment in terms of the following points. In the pixel signal processing part 400E of the sixth embodiment, the first and second sampling capacitors CS411 and CC421 are formed by a single capacitor, which is shared between the first and second reading parts 410E and 420E. In the present example, the first sampling capacitor CS411 is used.

In the pixel signal processing part 400E relating to the sixth embodiment, the constituents are connected to each other in the following manner.

In the pixel signal processing part 400E, the input node ND401 is connected to the sampling capacitor CS411, the first input switch 412 is connected between the sampling capacitor CS411 and the first node ND411, which is connected to the inverting input terminal (−) of an amplifier 411E serving as a first operational amplifier, and the second input switch 421 is connected between the sampling capacitor CS411 and the third node ND413, which is connected to the non-inverting input terminal (+) of the amplifier 411E. The feedback capacitor CF411 is connected between the output terminal of the amplifier 411E and the first node ND411, which is connected to the inverting input terminal (−), the reset switch RST411 is connected between the second node ND412, which is connected to the output terminal of the amplifier 411E, and the first node ND411, which is connected to the inverting input terminal (−), a tenth switch 4110 is connected between (i) the attenuation capacitor CSH421 and (ii) the connection node ND403 between one of the electrodes of the sampling capacitor CS411 and the first and second input switches 412 and 421, and the third switch 414 is connected between the referential potential VB and the non-inverting input terminal (+) of the amplifier 411E.

With the above-described configuration, in the first-conversion-gain signal read-out mode, the first input switch 412 and the third switch 414 remain in the conduction state as shown in FIG. 15. On the other hand, the reset switch RST411, the tenth switch 4110, and the second input switch 421 remain in the non-conduction state.

In the second-conversion-gain signal read-out mode, the first input switch 412 and the third switch 414 remain in the non-conduction state. On the other hand, the reset switch RST411, the tenth switch 4110, and the second input switch 421 remain in the conduction state.

The sixth embodiment can not only produce the same effects as the above-described second embodiment but also achieve a smaller number of parts, a reduced pixel size and eventually a simplified stacked structure. For example, in the stacked structure, when one of the sampling capacitor CS411 and the feedback capacitor CF411 is placed on the upper first substrate 110, the other of the feedback capacitor CF411 and the sampling capacitor CS411 is placed on the lower second substrate 129. The sixth embodiment can achieve a smaller number of switches and adjust the gain more easily than the above-described fifth embodiment.

Seventh Embodiment

Figure 17:
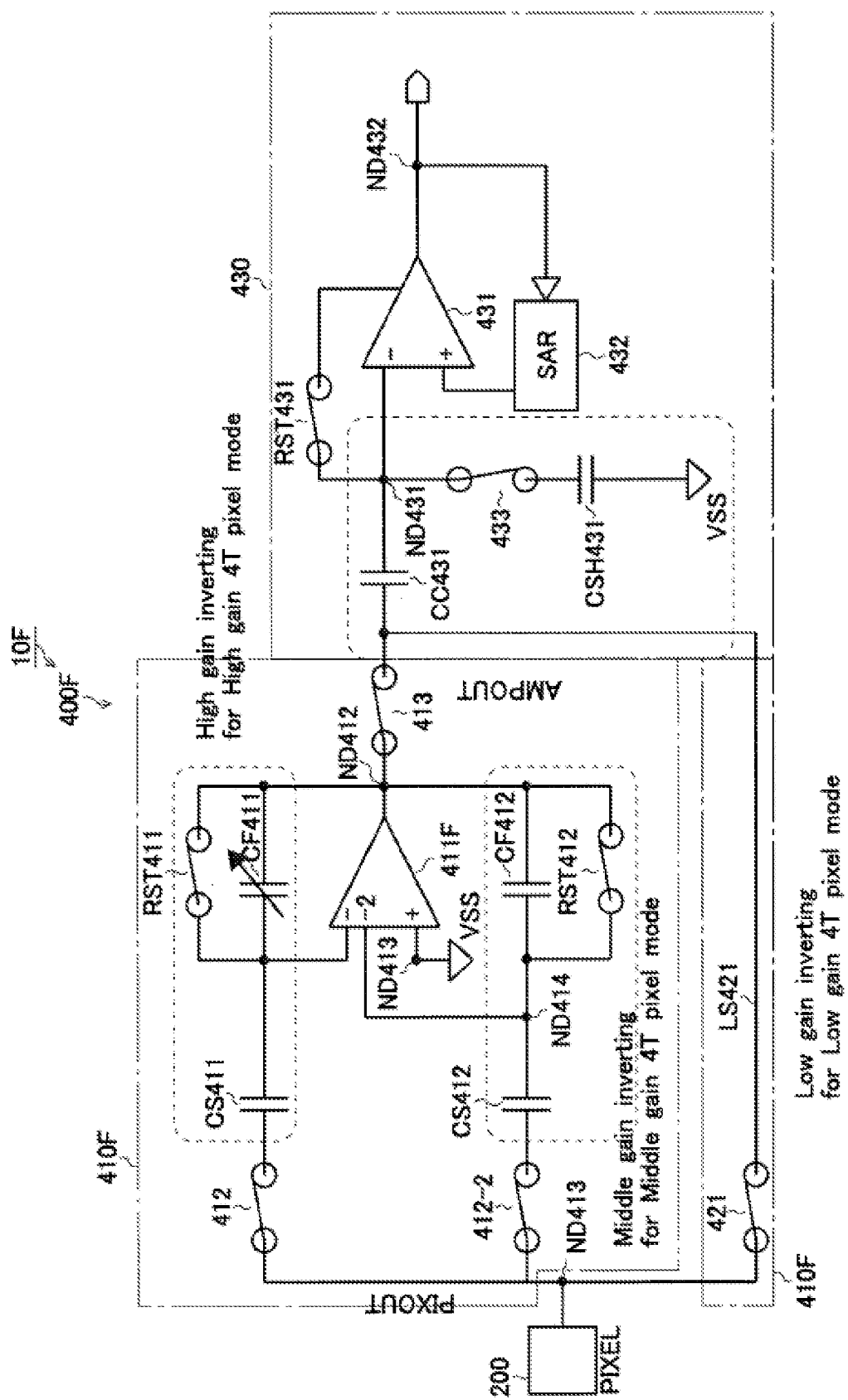
FIG. 17 is a circuit diagram showing an example configuration of a pixel signal processing part according to a seventh embodiment of the present invention.

FIG. 17 is a circuit diagram showing an example configuration of a pixel signal processing part according to a seventh embodiment of the present invention.

A pixel signal processing part 400F relating to the seventh embodiment differs from the pixel signal processing part 400 relating to the first embodiment in terms of the following points. The pixel signal processing part 400 relating to the first embodiment is configured to read two types of or dual-conversion-gain signals. The pixel signal processing part 400F relating to the seventh embodiment, on the other hand, is configured to read a plurality of types of, more specifically, three types of or triple-conversion-gain signals in the seventh embodiment.

In a first reading part 410F of the pixel signal processing part 400F relating to the seventh embodiment, the input channel to an amplifier 411F serving as a first operational amplifier is constituted by two channels, instead of a single channel. Specifically, the number of channels into the inverting input terminal (−) of amplifier 411F is increased to two. In other words, the inverting input terminal (−) of the amplifier 411F has a second inverting input terminal (−) 2 in addition to the first inverting input terminal shown in FIG. 4. The first reading part 410F further includes a third input switch 412-2 and a third sampling capacitor CS412 connected in series between the input node ND401 and the second inverting input terminal (−)2 of the amplifier 411F, a second feedback capacitor CF412 connected between the second inverting input terminal (−)2 and the output terminal of the amplifier 411F connected to the connection node ND402, and a second reset switch RST412 connected between the inverting input terminal (−)2 and the output terminal of the amplifier 411F connected to the connection node ND402. The non-inverting input terminal (+) of the amplifier 411F is connected to the reference potential VSS.

In the pixel signal processing part 400F, the first input switch 412 remains in the conduction state in the first-conversion-gain signal read-out mode. The second input switch 421 remains in the conduction state in the second-conversion-gain signal read-out mode. The third input switch 412-2 remains in the conduction state in a third-conversion-gain signal read-out mode applying a third conversion gain between the first and second conversion gains.

A readable pixel 200F relating to the seventh embodiment is subject to, for example, under control of the reading part 70, first-conversion-gain mode read-out and second-conversion-gain mode read-out in a designated dual-conversion-gain read-out mode period. In the first-conversion-gain mode read-out, pixel signals are read with the first conversion gain (high conversion gain (HCG)) corresponding to the first capacitance. In the second-conversion-gain mode reading, pixel signals are read with the second conversion gain (low conversion gain: LCG) corresponding to the second capacitance. In the circuit system of the pixel signal processing part 400F, inversion high-gain processing (I-HCG), inversion low-gain processing (I-LCG), and non-inversion attenuation processing (N-ATT) are performed. In the seventh embodiment, the circuit system of the pixel signal processing part 400F can read the pixel signals with a third conversion gain (middle conversion gain: MCG) corresponding to a third capacitance (different from the first and second capacitances), which is an intermediate value between the first conversion gain (high conversion gain: HCG) corresponding to the first capacitance and the second conversion gain (low conversion gain: LCG) corresponding to the second capacitance.

According to the seventh embodiment described above, the third conversion gain (middle conversion gain) MCG is configured between the first conversion gain (high conversion gain) HCG and the second conversion gain (low conversion gain) LCG. This can contribute to minimize degradation of the SNR at the conjunction point through the CDS operation between the first conversion gain (high conversion gain) HCG and the third conversion gain (middle conversion gain) MCG. In addition, although through a DDS operation, the second conversion gain (low conversion gain) LCG is combined with the third conversion gain (middle conversion gain) MCG. This enables mode transition to take place in a high signal amount region (where the SNR is high) and can reduce the degradation of the SNR to the maximum extent.

Figure 18:
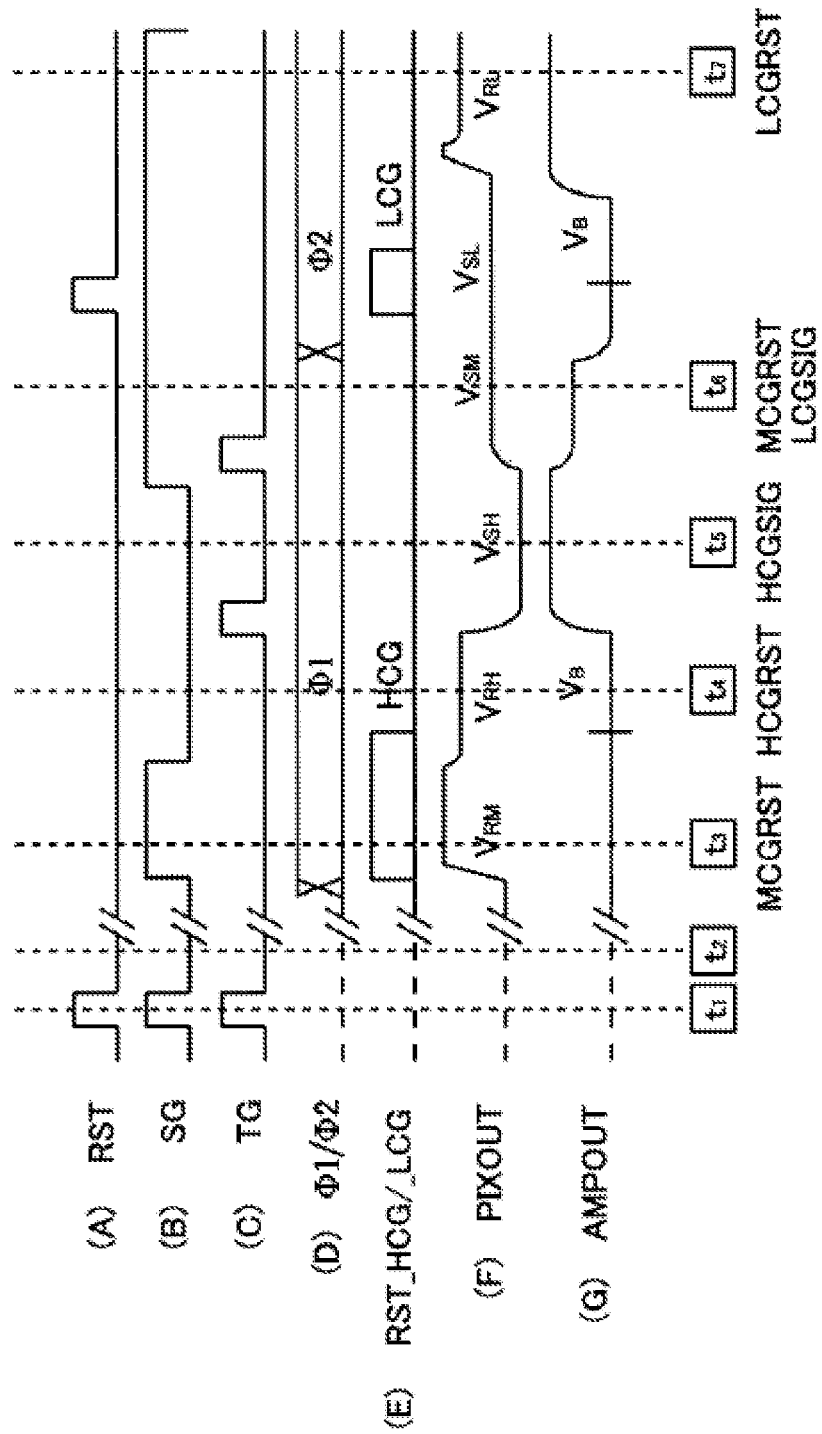
FIG. 18 is a timing chart to illustrate how to read a pixel signal from a readable pixel in a conversion-gain read-out mode in a solid-state imaging device relating to the seventh embodiment of the present invention.
Figure 19:
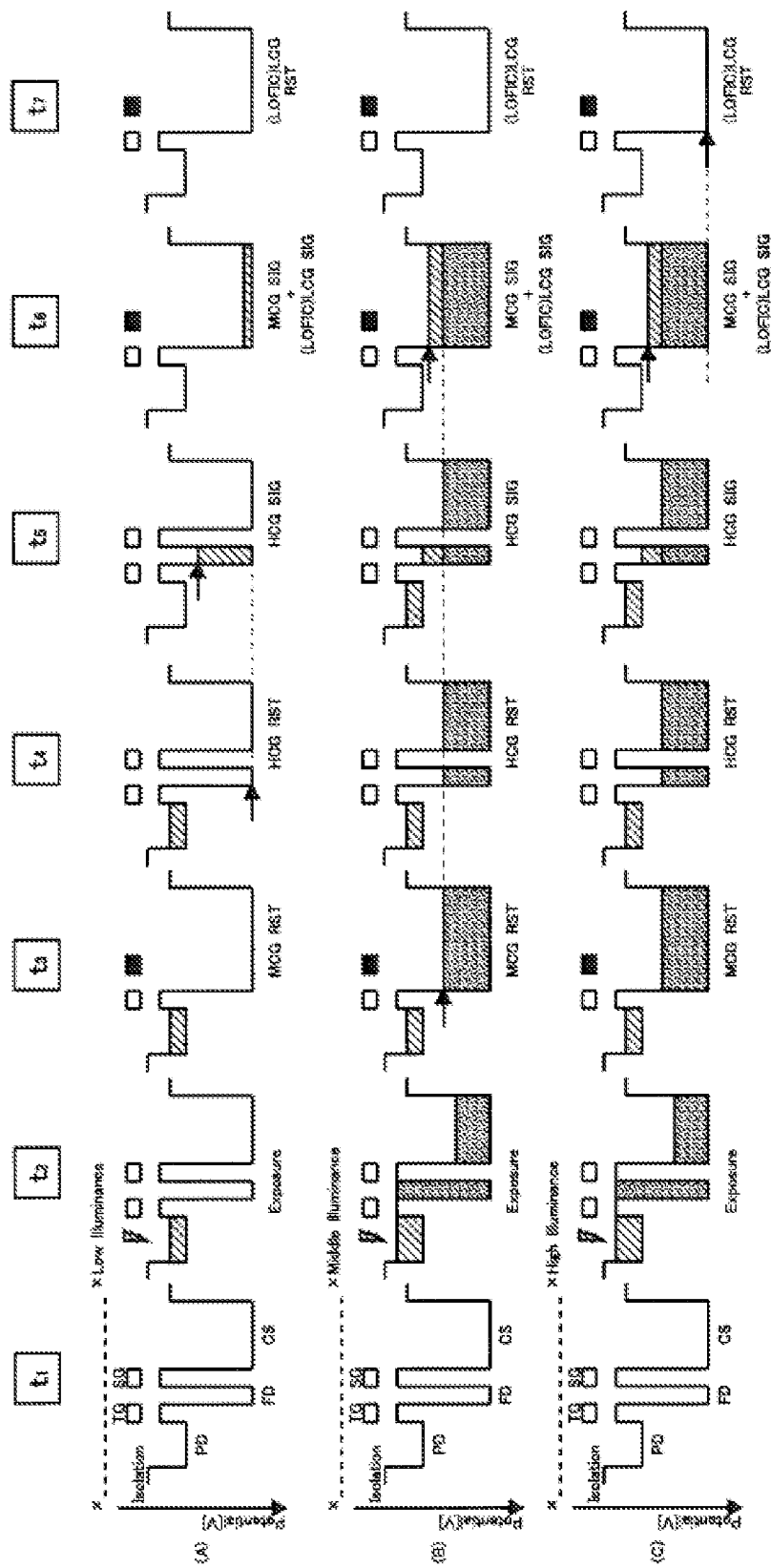
FIG. 19 illustrates a sequence of operations and potential transition to explain operations performed in the conversion-gain read-out mode in the solid-state imaging device relating to the seventh embodiment of the present invention in low, middle and high illuminance circumstances.

FIG. 18 is a timing chart including parts (A) to (G) to illustrate how to read the pixel signal from the readable pixel in the conversion-gain read-out mode in the solid-state imaging device relating to the seventh embodiment of the present invention. FIG. 19 includes views (A) to (C) illustrating a sequence of operations and potential transition to explain how the solid-state imaging device relating to the seventh embodiment of the present invention operates in the conversion-gain read-out mode in high, medium and low illuminance circumstances.

In FIG. 18, the part (A) shows the control signal RST for the reset transistor RST11-Tr of the readable pixel 200F, the part (B) shows the control signal SG for the storage transistor SG11-Tr of the readable pixel 200F, and the part (C) shows the control signal TG for the transfer transistor TG11-Tr of the readable pixel 200F. In FIG. 18, the part (D) shows the control signal φ1 for the first input switch 412 and the output switch 413 of the first reading part 410F of the pixel signal processing part 400F, and the control signal φ2 for the second input switch 421 of the second reading part 420 and the third input switch 433 of the AD converting part 430. In FIG. 18, the part (E) shows the control signal RST_HCG for the first reset switch RST411 of the first reading part 410F of the pixel signal processing part 400F and the control signal RST_LCG for the second reset switch RST431 of the AD converting part 430. In FIG. 18, the part (F) shows the pixel signal PIXOUT read from the readable pixel 200F, and the part (G) shows the amplified output signal AMPOUT from the first and second reading parts 410F and 420F of the pixel signal processing part 400F.

The pixel signal processing part 400F reads the conversion-gain signals in the following manner. The readable pixel 200F can produce, as readable pixel signals, the first-conversion-gain signal (HCGRST, HCGSIG) and the second-conversion-gain signal (LCGRST, LCGSIG), which correspond to the two conversion gains and have opposite signal directions (level transitioning directions). In the pixel signal processing part 400F, the first reading part 410F first performs inversion read-out (LCG×I-LCG) for a third read-out reset signal MCGRST produced with the third conversion gain MCG, which is configured between the first conversion gain HCG and the second conversion gain LCG. Next, the first reading part 410F performs inversion read-out (HCG×I-HCG) for the first read-out reset signal HCGRST produced with the first conversion gain HCG. Subsequently, the first reading part 410F performs inversion read-out (HCG×I-HCG) for the first read-out luminance signal HCGSIG produced with the first conversion gain HCG. Following this, the first reading part 410F performs inversion read-out (LCG×I-LCG) for a third read-out luminance signal MCGSIG with the third conversion gain MCG. Furthermore, the second reading part 420F performs non-inversion read-out (LCG×N-AT) for the second read-out luminance signal LCGSIG produced with the second conversion gain LCG. Next, the second reading part 420F performs non-inversion read-out (LCG×N-AT) for the second read-out reset signal LCG produced with the second conversion gain LCG.

The seventh embodiment can produce the same effects as the above-described first embodiment. Furthermore, according to the seventh embodiment, the third conversion gain (middle conversion gain) MCG is configured between the first conversion gain (high conversion gain) HCG and the second conversion gain (low conversion gain) LCG. This can contribute to minimize degradation of the SNR at the conjunction point through the CDS operation between the first conversion gain (high conversion gain) HCG and the third conversion gain (middle conversion gain) MCG. In addition, although through a DDS operation, the second conversion gain (low conversion gain) LCG is combined with the third conversion gain (middle conversion gain) MCG. This enables mode transition to take place in a high signal amount region (where the SNR is high) and can reduce the degradation of the SNR to the maximum extent.

The solid-state imaging devices 10, 10A to 10F described above can be applied, as imaging devices, to electronic apparatuses such as digital cameras, video cameras, mobile terminals, surveillance cameras, and medical endoscope cameras.

Figure 20:
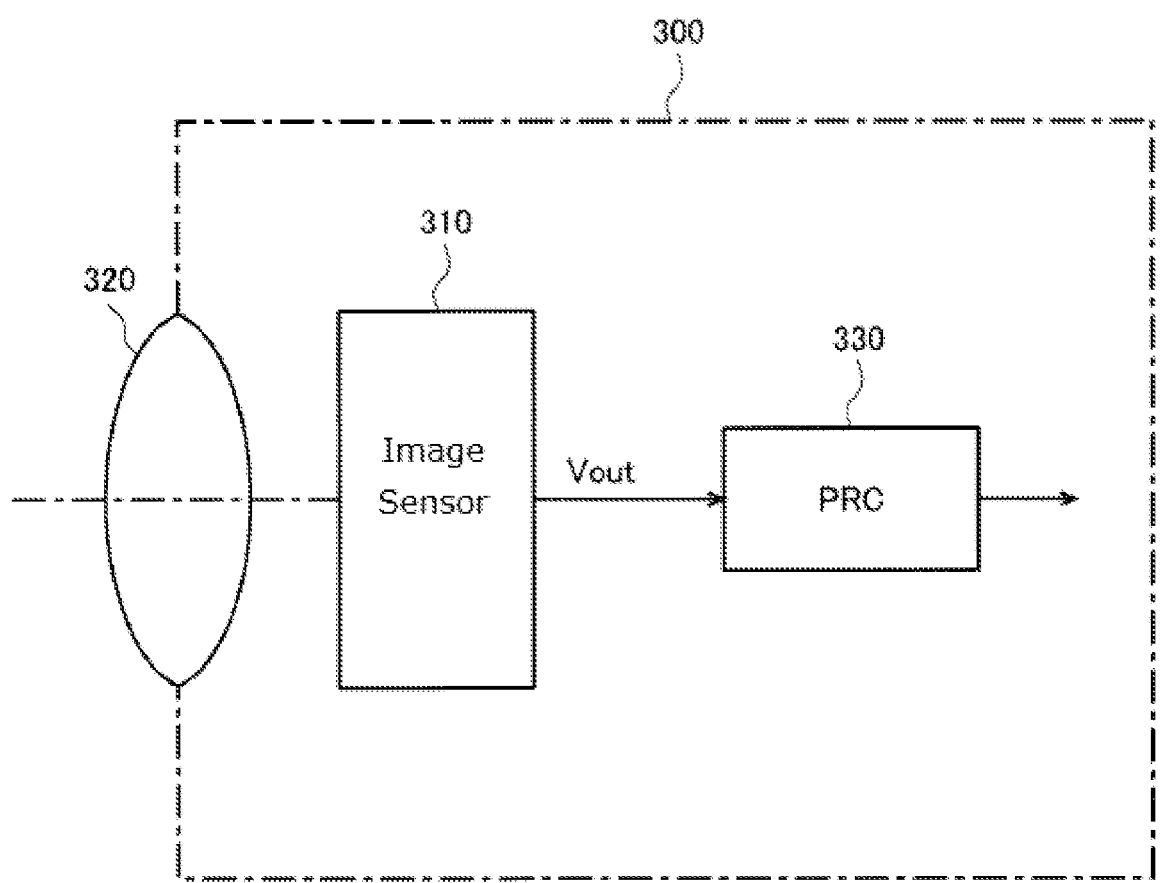
FIG. 20 shows an example configuration of an electronic apparatus to which the solid-state imaging devices relating to the embodiments of the present invention can be applied.

FIG. 20 shows an example configuration of an electronic apparatus including a camera system to which the solid-state imaging devices according to the embodiments of the present invention can be applied.

As shown in FIG. 20, an electronic apparatus 300 includes a CMOS image sensor 310 that can be constituted by the solid-state imaging devices 10, 10A, 10B, 10C, 10D, 10E and 10F relating to the embodiments of the present invention. The electronic apparatus 300 further includes an optical system (such as a lens) 420 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the above-described solid-state imaging device 10, 10A, 10B, 10C, 10D, 10E, or 10F as the CMOS image sensor 310.

Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

LIST OF REFERENCE NUMBERS 10, 10A to 10F solid-state imaging device
20 pixel part
200, 200F readable pixel
PD11 photodiode,
FD11 floating diffusion
TG11-Tr transfer transistor
RST11-Tr . . . reset transistor
SF11-Tr source follower transistor
SG11-Tr storage transistor
CS11 storage capacitor
30 vertical scanning circuit
40 reading circuit
400, 400A to 400F pixel signal processing part
410, 410A to 410F first reading part
411, 411A to 411F amplifier (first operational amplifier)
ND401 input node
ND402 connection node
420, 420A to 420F second reading part
421 second input node
430 AD converting part
431 amplifier (second operational amplifier)
50 horizontal scanning circuit
60 timing control circuit
70 reading part
300 electronic apparatus
310 CMOS image sensor
320 optical system
330 signal processing circuit (PRC)

What is claimed is:
1. A solid-state imaging device comprising:
a readable pixel for performing photoelectric conversion, the readable pixel being configured to produce, as a readable pixel signal, a first-conversion-gain signal and a second-conversion-gain signal corresponding to at least two conversion gains and having opposite signal directions; and
a pixel signal processing part for processing the pixel signal read out from the readable pixel,
wherein the pixel signal processing part includes:
an input node for receiving the pixel signal read out from the readable pixel input thereto;
a connection node connected to a next-stage circuit;
a first reading part for inverting a signal direction of the first-conversion-gain signal of the pixel signal input into the input node and outputting an inverted first-conversion-gain signal to the connection node; and
a second reading part for keeping a signal direction of the second-conversion-gain signal of the pixel signal input into the input node unchanged and outputting a non-inverted second-conversion-gain signal to the connection node, and
wherein the first reading part includes:
a first operational amplifier whose inverting input terminal is connected to the input node;

a first input switch and a first sampling capacitor connected in series between the inverting input terminal of the first operational amplifier and the input node;

a feedback capacitor connected between (i) an output terminal of the first operational amplifier connected to the connection node and (ii) the inverting input terminal; and a reset switch connected between (i) the output terminal of the first operational amplifier connected to the connection node and (ii) the inverting input terminal, wherein the first input switch remains in a conduction state in a first-conversion-gain signal read-out mode, and wherein a non-inverting input terminal of the first operational amplifier is connectable at least to a referential potential.

2. The solid-state imaging device according to claim 1, wherein the second reading part includes a second input switch connected between the input node and the connection node, and wherein the second input switch remains in a conduction state in a second-conversion-gain signal read-out mode.

3. The solid-state imaging device of claim 1, wherein the pixel signal processing part includes a first operational amplifier shared between the first and second reading parts, wherein the first reading part includes:
a third switch configured to selectively connect together the non-inverting input terminal and the referential potential, wherein the second reading part includes:
a second input switch and a second sampling capacitor connected in series between the input node and the non-inverting input terminal; and
an attenuation capacitor connected between the non-inverting input terminal and a reference potential, wherein the first input switch and the third switch remain in a conduction state in a first-conversion-gain signal read-out mode, and wherein the second input switch and the reset switch remain in a conduction state in a second-conversion-gain signal read-out mode.

4. The solid-state imaging device of claim 3, wherein the second reading part includes a fourth switch configured to connect, to the reference potential, at least a connection signal line extending between the second input switch and the non-inverting input terminal in the first-conversion-gain signal read-out mode.

5. The solid-state imaging device of claim 3, comprising a fifth switch configured to selectively connect (i) the non-inverting input terminal and (ii) a connection node between the second sampling capacitor and the attenuation capacitor.

6. The solid-state imaging device of claim 3, wherein the first and second reading parts:
share a single capacitor serving as the first and second sampling capacitors; and
share a single capacitor serving as the feedback capacitor and the attenuation capacitors.

7. The solid-state imaging device of claim 6, wherein the input node is connected to the sampling capacitor, wherein the first input switch is connected between the sampling capacitor and an inverting input terminal of the first operational amplifier, wherein the second input switch is connected between the sampling capacitor and the non-inverting input terminal of the first operational amplifier, wherein the feedback capacitor is connected between (i) the output terminal of the first operational amplifier connected to the connection node and (ii) the inverting input terminal, wherein the reset switch is connected between (i) the output terminal of the first operational amplifier connected to the connection node and (ii) the inverting input terminal, and wherein a sixth switch is connected between a first one of electrodes of the feedback capacitor and the inverting input terminal of the first operational amplifier, wherein a seventh switch is connected between a second one of the electrodes of the feedback capacitor and the output terminal of the first operational amplifier, wherein an eighth switch is connected between the first one of the electrodes of the feedback capacitor and the non-inverting input terminal of the first operational amplifier, wherein a ninth switch is connected between the second one of the electrodes of the feedback capacitor and the reference potential, and wherein the third switch is connected between (i) the non-inverting input terminal of the first operational amplifier and (ii) the referential potential.

8. The solid-state imaging device of claim 7, wherein in the first-conversion-gain signal read-out mode, the first input switch, the third switch, the sixth switch and the seventh switch remain in a conduction state, and the second input switch, the reset switch, the eighth switch, and the ninth switch remain in a non-conduction state, and wherein in the second-conversion-gain signal read-out mode, the first input switch, the third switch, the sixth switch and the seventh switch remain in a non-conduction state, and the second input switch, the reset switch, the eighth switch, and the ninth switch remain in a conduction state.

9. The solid-state imaging device of claim 3, wherein the first and second reading parts share a single capacitor serving as the first and second sampling capacitors.

10. The solid-state imaging device of claim 9, wherein the input node is connected to the sampling capacitor, wherein the first input switch is connected between the sampling capacitor and the inverting input terminal of the first operational amplifier, wherein the second input switch is connected between the sampling capacitor and the non-inverting input terminal of the first operational amplifier, wherein the feedback capacitor is connected between (i) the output terminal of the first operational amplifier connected to the connection node and (ii) the inverting input terminal, wherein the reset switch is connected between (i) the output terminal of the first operational amplifier connected to the connection node and (ii) the inverting input terminal, wherein a tenth switch is connected between (i) a connection node between a first one of electrodes of the sampling capacitor and the first and second switches and (ii) the attenuation capacitor, and wherein the third switch is connected between (i) the non-inverting input terminal of the first operational amplifier and (ii) the referential potential.

11. The solid-state imaging device of claim 10,
wherein in the first-conversion-gain signal read-out mode, the first input switch and the third switch remain in a conduction state, and the reset switch and the tenth switch remain in a non-conduction state, and
wherein in the second-conversion-gain signal read-out mode, the first input switch and the third switch remain in a non-conduction state, and the reset switch and the tenth switch remain in a conduction state.

12. The solid-state imaging device of claim 1,
wherein, in the first operational amplifier, the inverting input terminal has, in addition to a first inverting input terminal serving as the inverting input terminal, at least a second inverting input terminal,
wherein the first reading part further includes:
    a third input switch and a third sampling capacitor connected in series between the second inverting input terminal of the first operational amplifier and the input node;
    a second feedback capacitor connected between (i) an output terminal of the first operational amplifier connected to the connection node and (ii) the second inverting input terminal; and
    a second reset switch connected between (i) the output terminal of the first operational amplifier connected to the connection node and (ii) the second inverting input terminal.

13. The solid-state imaging device of claim 12,
wherein the first input switch remains in a conduction state in a first-conversion-gain signal read-out mode,
wherein the second input switch remains in a conduction state in a second-conversion-gain signal read-out mode, and
wherein the third input switch remains in a conduction state in a third-conversion-gain signal read-out mode applying a third conversion gain between the first and second conversion gains.

14. The solid-state imaging device of claim 1,
wherein the readable pixel is configured to produce, as a readable pixel signal, a first-conversion-gain signal and a second-conversion-gain signal corresponding to two conversion gains and having opposite signal directions, and
wherein, in the pixel signal processing part, the first reading part performs, in a first-conversion-gain signal read-out mode, inversion read-out for a first read-out reset signal produced with a first conversion gain, and subsequently inversion read-out for a first read-out luminance signal produced with the first conversion gain, and
the second reading part performs, in a second-conversion-gain signal read-out mode, non-inversion read-out for a second read-out luminance signal produced with a second conversion gain, and subsequently non-inversion read-out for a second read-out reset signal produced with the second conversion gain.

15. The solid-state imaging device of claim 12,
wherein the readable pixel is configured to produce, as a readable pixel signal, a first-conversion-gain signal and a second-conversion-gain signal corresponding to respective conversion gains and having opposite signal directions,
wherein, in the pixel signal processing part,
the first reading part:
    performs inversion read-out for a third read-out reset signal produced with a third conversion gain between the first conversion gain and the second conversion gain;
    subsequently performs inversion read-out for a first read-out reset signal produced with a first conversion gain;
    subsequently performs inversion read-out for a first read-out luminance signal produced with the first conversion gain; and
    subsequently performs inversion read-out for a third read-out luminance signal produced with the third conversion gain, and
the second reading part:
    performs non-inversion read-out for a second read-out luminance signal produced with the second conversion gain; and
    subsequently performs non-inversion read-out for a second read-out reset signal produced with the second conversion gain.

16. The solid-state imaging device of claim 1,
wherein the pixel signal processing part includes an analog-to-digital (AD) converting part for analog-to-digital converting the pixel signal that is processed by the first and second reading parts and output from the connection node,
wherein the first reading part or the AD converting part includes:
    a sample-and-hold switch arranged on a connecting line between an output terminal of a first operational amplifier and the connection node,
wherein the AD converting part includes:
    a second operational amplifier;
    an input capacitor connected between an inverting input terminal of the second operational amplifier and the sample-and-hold switch;
    an eleventh switch connected to the inverting input terminal of the second operational amplifier, the eleventh switch being configured to remain in a conduction state in the second-conversion-gain signal read-out mode;
    a sample-and-hold capacitor connected between the eleventh switch and a reference potential; and
    a third reset switch connected between the inverting input terminal of the second operational amplifier and an output terminal of the second operational amplifier, the third reset switch being configured to remain in a conduction state in the second-conversion-gain signal read-out mode, and
wherein a non-inverting input terminal of the second operational amplifier is connectable to a referential potential or the output terminal of the second operational amplifier.

17. A method for driving a solid-state imaging device, the solid-state imaging device including:
a readable pixel for performing photoelectric conversion, the readable pixel being configured to produce, as a readable pixel signal, a first-conversion-gain signal and a second-conversion-gain signal corresponding to at least two conversion gains and having opposite signal directions; and
a pixel signal processing part for processing the pixel signal read out from the readable pixel,
wherein the pixel signal processing part includes:
    an input node for receiving the pixel signal read out from the readable pixel input thereto;
    a connection node connected to a next-stage circuit;

a first reading part for inverting a signal direction of the first-conversion-gain signal of the pixel signal input into the input node and outputting an inverted first-conversion-gain signal to the connection node; and a second reading part for keeping a signal direction of the second-conversion-gain signal of the pixel signal input into the input node unchanged and outputting a non-inverted second-conversion-gain signal to the connection node, wherein the first reading part performs, in a first-conversion-gain signal read-out mode, inversion read-out for a first read-out reset signal produced with a first conversion gain, and subsequently inversion read-out for a first read-out luminance signal produced with the first conversion gain, and the second reading part performs, in a second-conversion-gain signal read-out mode, non-inversion read-out for a second read-out luminance signal produced with a second conversion gain, and subsequently non-inversion read-out for a second read-out reset signal produced with the second conversion gain, wherein the first reading part includes:
  a first operational amplifier whose inverting input terminal is connected to the input node;
  a first input switch and a first sampling capacitor connected in series between the inverting input terminal of the first operational amplifier and the input node;
  a feedback capacitor connected between (i) an output terminal of the first operational amplifier connected to the connection node and (ii) the inverting input terminal; and
  a reset switch connected between (i) the output terminal of the first operational amplifier connected to the connection node and (ii) the inverting input terminal, wherein the first input switch remains in a conduction state in a first-conversion-gain signal read-out mode, and wherein a non-inverting input terminal of the first operational amplifier is connectable at least to a referential potential.

18. An electronic apparatus comprising:
a solid-state imaging device; and
an optical system for forming a subject image on the solid-state imaging device,
wherein the solid-state imaging device includes:
  a readable pixel for performing photoelectric conversion, the readable pixel being configured to produce, as a readable pixel signal, a first-conversion-gain signal and a second-conversion-gain signal corresponding to at least two conversion gains and having opposite signal directions; and
  a pixel signal processing part for processing the pixel signal read out from the readable pixel, wherein the pixel signal processing part includes:
  an input node for receiving the pixel signal read out from the readable pixel input thereto;
  a connection node connected to a next-stage circuit;
  a first reading part for inverting a signal direction of the first-conversion-gain signal of the pixel signal input into the input node and outputting an inverted first-conversion-gain signal to the connection node; and
  a second reading part for keeping a signal direction of the second-conversion-gain signal of the pixel signal input into the input node unchanged and outputting a non-inverted second-conversion-gain signal to the connection node, wherein the first reading part includes:
  a first operational amplifier whose inverting input terminal is connected to the input node;
  a first input switch and a first sampling capacitor connected in series between the inverting input terminal of the first operational amplifier and the input node;
  a feedback capacitor connected between (i) an output terminal of the first operational amplifier connected to the connection node and (ii) the inverting input terminal; and
  a reset switch connected between (i) the output terminal of the first operational amplifier connected to the connection node and (ii) the inverting input terminal, wherein the first input switch remains in a conduction state in a first-conversion-gain signal read-out mode, and wherein a non-inverting input terminal of the first operational amplifier is connectable at least to a referential potential.

* * * * *